United States Patent
Li et al.

(10) Patent No.: US 11,595,196 B2
(45) Date of Patent: Feb. 28, 2023

(54) QUANTUM KEY DISTRIBUTION METHOD AND DEVICE, AND STORAGE MEDIUM

(71) Applicant: HUAWEI TECHNOLOGIES CO., LTD., Guangdong (CN)

(72) Inventors: Zhengyu Li, Shenzhen (CN); Changzheng Su, Shenzhen (CN); Su Hu, Shenzhen (CN); Yang Zou, Oerlikon (CH)

(73) Assignee: Huawei Technologies Co., Ltd., Shenzhen (CN)

(*) Notice: Subject to any disclaimer, the term of this patent is extended or adjusted under 35 U.S.C. 154(b) by 189 days.

(21) Appl. No.: 17/069,317

(22) Filed: Oct. 13, 2020

(65) Prior Publication Data

US 2021/0044432 A1 Feb. 11, 2021

Related U.S. Application Data

(63) Continuation of application No. PCT/CN2019/082405, filed on Apr. 12, 2019.

(30) Foreign Application Priority Data

Apr. 13, 2018 (CN) .......................... 201810332715.5

(51) Int. Cl.
*H04L 9/08* (2006.01)
*G06N 10/00* (2022.01)
*H04L 9/06* (2006.01)

(52) U.S. Cl.
CPC .......... *H04L 9/0852* (2013.01); *G06N 10/00* (2019.01); *H04L 9/0618* (2013.01); *H04L 9/083* (2013.01);
(Continued)

(58) Field of Classification Search
CPC ... H04L 9/0852; H04L 9/0618; H04L 9/0819; H04L 9/0822; H04L 9/083; H04L 9/0855;
(Continued)

(56) References Cited

U.S. PATENT DOCUMENTS 8,340,298 B2* 12/2012 Gelfond .................. H04L 9/006
380/278
11,196,550 B2* 12/2021 Yuan ...................... H04B 10/70
(Continued)

FOREIGN PATENT DOCUMENTS

CN 105471576 A 4/2016
CN 105827397 A 8/2016
(Continued)

OTHER PUBLICATIONS

Y. Tanizawa, R. Takahashi and A. R. Dixon, "A routing method designed for a Quantum Key Distribution network," 2016 Eighth International Conference on Ubiquitous and Future Networks (ICUFN), 2016, pp. 208-214, doi: 10.1109/ICUFN.2016.7537018. (Year: 2016).*
(Continued)

*Primary Examiner* — Michael Simitoski
(74) *Attorney, Agent, or Firm* — Fish & Richardson P.C.

(57) ABSTRACT

This application provide quantum key distribution methods, devices, and storage media. In an implementation, a method comprises: determining, based on a first mapping, a first quantum key of N first quantum keys corresponding to an $i^{th}$ node on a target routing path; determining, based on a second mapping, a second quantum key of N second quantum keys corresponding to the $i^{th}$ node; and generating, by the $i^{th}$ node based on the first quantum key corresponding to the $i^{th}$ node and the second quantum key corresponding to the $i^{th}$ node, a third quantum key corresponding to the $i^{th}$ node on the target routing path.

18 Claims, 11 Drawing Sheets

(52) U.S. Cl.
CPC .......... *H04L 9/0819* (2013.01); *H04L 9/0822* (2013.01); *H04L 9/0855* (2013.01)

(58) Field of Classification Search
CPC ....... H04L 9/0866; H04L 9/0894; H04L 9/12; H04L 9/14; H04L 63/06; H04L 63/18; H04L 2209/76; G06N 10/00
See application file for complete search history.

(56) References Cited

U.S. PATENT DOCUMENTS

| | | | |
|---|---|---|---|
| 2004/0184603 A1 | 9/2004 | Pearson et al. | |
| 2005/0286723 A1 | 12/2005 | Vig et al. | |
| 2010/0299526 A1* | 11/2010 | Wiseman | H04L 63/061 713/171 |
| 2013/0208894 A1 | 8/2013 | Bovino | |
| 2016/0248581 A1* | 8/2016 | Fu | H04L 45/00 |
| 2019/0074961 A1* | 3/2019 | Tanizawa | H04L 9/088 |
| 2019/0260581 A1* | 8/2019 | Su | H04L 9/0855 |

FOREIGN PATENT DOCUMENTS

| | | |
|---|---|---|
| CN | 106330434 A | 1/2017 |
| CN | 107248913 A | 10/2017 |
| CN | 107508671 A | 12/2017 |
| WO | 2004086666 A2 | 10/2004 |

OTHER PUBLICATIONS

Chen et al., "Metropolitan all-pass and inter-city quantum communication network," Optics Express, vol. 18, No. 26, Dec. 20, 2010, 9 pages.
Elliott, "Building the quantum network," New Journal of Physics, vol. 4, No. 1, Jul. 12, 2002, 13 pages.
Han Wei et al., "QKD Network Routing Research Based on Trust Relay," Journal of Military Communications Technology, vol. 34 No. 4, Dec. 2013, 7 pages (with English abstract).
Office Action issued in Chinese Application No. 201810332715.5 dated May 8, 2020, 12 pages (with English translation).
PCT International Search Report and Written Opinion issued in International Application No. PCT/CN2019/082405 dated Jun. 27, 2019, 14 pages (with English translation).
Peev et al., "The SECOQC quantum key distribution network in Vienna," New Journal of Physics vol. 11, No. 7, Jul. 2009, 38 pages.
Sasaki et al., "Field test of quantum key distribution in the Tokyo QKD Network," Optics Express, vol. 19, No. 11, May 23, 2011, 23 pages.
Schartner et al., "How to overcome the Trusted Node Model in Quantum Cryptography," 2009 International Conference on Computational Science and Engineering, Aug. 2009, 4 pages.
Wang et al., "25 MHz clock continuous-variable quantum key distribution system over 50km fiber channel," Scientific Reports, Sep. 30, 2015, 8 pages.
Zhao Hong-tao et al., "Multi-path Quantum Key-negotiation Technique Based on Bit-negotiation," Journal of Zhongyuan University of Technology, vol. 25 No. 6, Dec. 2014, 4 pages (with English abstract).
Extended European Search Report issued in European Application No. 197886235.2 dated May 4, 2021, 10 pages.
Quoc et al., "A New Proposal for QKD Relaying Models," 2008 Proceedings of 17th International Conference on Computer Communications and Networks, Nov. 17, 2008, 6 pages.

* cited by examiner

| Figure example: | Routing path $L_1$: | B-D-E-G-P |
| | Routing path $L_2$: | B-D-E-G-Q |
| | Routing path $L_3$: | B-D-E-H |
| | Routing path $L_4$: | C-D-F |
| | Routing path $L_5$: | B-D-F |
| | Routing path $L_6$: | R-E-H |

| Row number | Ranking of previous-hop nodes of a node D on all routing paths passing through the node D | Ranking of next-hop nodes of the node D on all the routing paths passing through the node D | Ranking of all the routing paths passing through the node D | First quantum keys corresponding to the node D on all the routing paths passing through the node D |
|---|---|---|---|---|
| Second row | B | E | Routing path $L_1$ | First quantum key corresponding to the node D on the routing path $L_1$: $K_{DB}(L_1)$ |
| Third row | | | Routing path $L_2$ | First quantum key corresponding to the node D on the routing path $L_2$: $K_{DB}(L_2)$ |
| Fourth row | | | Routing path $L_3$ | First quantum key corresponding to the node D on the routing path $L_3$: $K_{DB}(L_3)$ |
| Fifth row | | F | Routing path $L_5$ | First quantum key corresponding to the node D on the routing path $L_5$: $K_{DB}(L_5)$ |
| Sixth row | C | F | Routing path $L_4$ | First quantum key corresponding to the node D on the routing path $L_4$: $K_{DC}(L_4)$ |

FIG. 6

| Row number | Ranking of next-hop nodes of a node D on all routing paths passing through the node D | Ranking of all the routing paths passing through the node D | First quantum keys corresponding to the node D on all the routing paths passing through the node D |
|---|---|---|---|
| Second row | E | Routing path $L_1$ | First quantum key corresponding to the node D on the routing path $L_1$: $K_{DB}(L_1)$ |
| Third row | | Routing path $L_2$ | First quantum key corresponding to the node D on the routing path $L_2$: $K_{DB}(L_2)$ |
| Fourth row | | Routing path $L_3$ | First quantum key corresponding to the node D on the routing path $L_3$: $K_{DB}(L_3)$ |
| Fifth row | F | Routing path $L_4$ | First quantum key corresponding to the node D on the routing path $L_4$: $K_{DC}(L_4)$ |
| Sixth row | | Routing path $L_5$ | First quantum key corresponding to the node D on the routing path $L_5$: $K_{DB}(L_5)$ |

FIG. 7

| Row number | Ranking of all routing paths passing through a node D | First quantum keys corresponding to the node D on all the routing paths passing through the node D |
|---|---|---|
| Second row | Routing path $L_1$ | First quantum key corresponding to the node D on the routing path $L_1$: $K_{DB}(L_1)$ |
| Third row | Routing path $L_2$ | First quantum key corresponding to the node D on the routing path $L_2$: $K_{DB}(L_2)$ |
| Fourth row | Routing path $L_3$ | First quantum key corresponding to the node D on the routing path $L_3$: $K_{DB}(L_3)$ |
| Fifth row | Routing path $L_4$ | First quantum key corresponding to the node D on the routing path $L_4$: $K_{DC}(L_4)$ |
| Sixth row | Routing path $L_5$ | First quantum key corresponding to the node D on the routing path $L_5$: $K_{DB}(L_5)$ |

FIG. 8

| Row number | Ranking of next-hop nodes of a node E on all routing paths passing through a node D and the node E | Ranking of all the routing paths passing through the node D and the node E | Second quantum keys corresponding to the node D on routing paths |
|---|---|---|---|
| Second row | G | Routing path $L_1$ | Second quantum key corresponding to the node D on the routing path $L_1$: $K_{DE}(L_1)$ |
| Third row | G | Routing path $L_2$ | Second quantum key corresponding to the node D on the routing path $L_2$: $K_{DE}(L_2)$ |
| Fourth row | H | Routing path $L_3$ | Second quantum key corresponding to the node D on the routing path $L_3$: $K_{DE}(L_3)$ |

FIG. 9

| Row number | Ranking of previous-hop nodes of a node E on all routing paths passing through the node E | Ranking of next-hop nodes of the node E on all the routing paths passing through the node E | Ranking of all the routing paths passing through the node E | First quantum keys corresponding to the node E on all the routing paths passing through the node E |
|---|---|---|---|---|
| Second row | D | G | Routing path $L_1$ | First quantum key corresponding to the node E on the routing path $L_1$: $K_{ED}(L_1)$ |
| Third row | | | Routing path $L_2$ | First quantum key corresponding to the node E on the routing path $L_2$: $K_{ED}(L_2)$ |
| Fourth row | | H | Routing path $L_3$ | First quantum key corresponding to the node E on the routing path $L_3$: $K_{ED}(L_3)$ |
| Fifth row | R | H | Routing path $L_6$ | First quantum key corresponding to the node E on the routing path $L_6$: $K_{EB}(L_6)$ |

FIG. 10

| Row number | Ranking of all routing paths passing through a node D and a node E | Second quantum keys corresponding to the node D on routing paths |
|---|---|---|
| Second row | Routing path $L_1$ | Second quantum key corresponding to the node D on the routing path $L_1$: $K_{DE}(L_1)$ |
| Third row | Routing path $L_2$ | Second quantum key corresponding to the node D on the routing path $L_2$: $K_{DE}(L_2)$ |
| Fourth row | Routing path $L_3$ | Second quantum key corresponding to the node D on the routing path $L_3$: $K_{DE}(L_3)$ |

FIG. 11

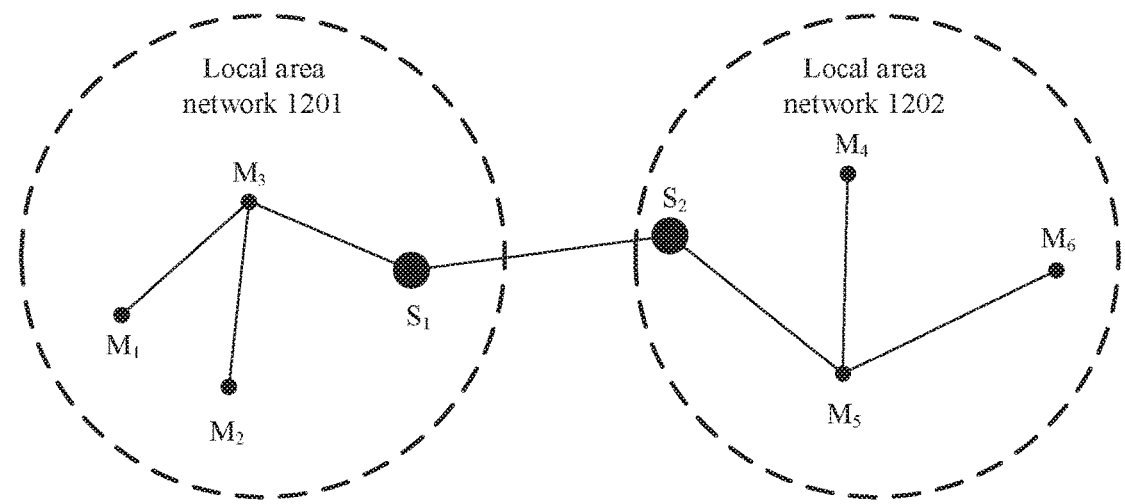

FIG. 12

QUANTUM KEY DISTRIBUTION METHOD AND DEVICE, AND STORAGE MEDIUM

CROSS-REFERENCE TO RELATED APPLICATIONS

This application is a continuation of International Application No. PCT/CN2019/082405, filed on Apr. 12, 2019, which claims priority to Chinese Patent Application No. 201810332715.5, filed on Apr. 13, 2018. The disclosures of the aforementioned applications are hereby incorporated by reference in their entireties.

TECHNICAL FIELD

This application relates to the quantum communication field, and in particular, to a quantum key distribution method and device, and a storage medium.

BACKGROUND

With development of science and technology, acceleration of informatization, and more frequent communication, an increasingly high requirement is posed on communication security. Secure quantum communication is a combination of a quantum feature and conventional cryptography, and uses a basic principle and feature of quantum mechanics to ensure communication security. After more than 30 years of development, secure quantum communication is practical in the market currently.

Currently, the most practical secure quantum communication technology is a quantum key distribution (QKD) technology, and the quantum key distribution technology is used to implement unconditionally secure distribution of a symmetric key on the premise that some security keys have been shared. FIG. 1 is a schematic diagram of a quantum key distribution method in the prior art. As shown in FIG. 1, a routing path includes a source node $A_1$, a relay node $A_2$, a relay node $A_3$, and a destination node $A_4$, and $K_1$ is a to-be-shared quantum key between the source node $A_1$ and the destination node $A_4$ and needs to be transmitted from the source node $A_1$ to the destination node $A_4$. In the prior art, the source node $A_1$ encrypts $K_1$ by using $K_{A1A2}$, to obtain $K_2$, and transmits obtained $K_2$ to the relay node $A_2$, where $K_{A1A2}$ is a private key shared or to be shared between the source node $A_1$ and the relay node $A_2$. The relay node $A_2$ decrypts $K_2$ by using $K_{A1A2}$, then encrypts $K_1$ by using $K_{A2A3}$, to obtain $K_3$, and transmits obtained $K_3$ to the relay node $A_3$, where $K_{A2A3}$ is a private key shared or to be shared between the relay node $A_2$ and the relay node $A_3$. The relay node $A_3$ decrypts $K_3$ by using $K_{A2A3}$, then encrypts K by using $K_{A3A4}$, to obtain $K_4$, and transmits obtained $K_4$ to the destination node $A_4$, where $K_{A3A4}$ is a private key shared or to be shared between the relay node $A_3$ and the destination node $A_4$. The destination node $A_4$ decrypts $K_4$ by using $K_{A3A4}$, to obtain $K_1$.

In the solution shown in FIG. 1, the to-be-shared quantum key $K_1$ between the source node $A_1$ and the destination node $A_4$ is decrypted by each relay node, and consequently security is relatively low.

SUMMARY

Embodiments of this application provide a quantum key distribution method and device, and a storage medium, to resolve a prior-art problem of low security when a quantum key is distributed between nodes.

According to a first aspect, an embodiment of this application provides a quantum key distribution method, where the method includes:

determining, by an $i^{th}$ node based on a first correspondence, a first quantum key corresponding to the $i^{th}$ node on a target routing path, where the $i^{th}$ node is the $i^{th}$ node on the target routing path, the first quantum key corresponding to the $i^{th}$ node on the target routing path is a quantum key that is obtained by the $i^{th}$ node and that is shared or to be shared between the $i^{th}$ node and an $(i-1)^{th}$ node on the target routing path, the first correspondence includes a correspondence between each of N routing paths passing through the $i^{th}$ node and each of N first quantum keys corresponding to the $i^{th}$ node, the N routing paths are in a one-to-one correspondence with the N first quantum keys corresponding to the $i^{th}$ node, the target routing path is one of the N routing paths, N is a positive integer, and i is a positive integer;

determining, by the $i^{th}$ node based on a second correspondence, a second quantum key corresponding to the $i^{th}$ node on the target routing path, where the second quantum key corresponding to the $i^{th}$ node on the target routing path is a quantum key that is obtained by the $i^{th}$ node and that is shared or to be shared between the $i^{th}$ node and an $(i+1)^{th}$ node on the target routing path, the second correspondence includes a correspondence between each of the N routing paths passing through the $i^{th}$ node and each of N second quantum keys corresponding to the $i^{th}$ node, and the N routing paths are in a one-to-one correspondence with the N second quantum keys corresponding to the $i^{th}$ node;

generating, by the $i^{th}$ node based on the first quantum key corresponding to the $i^{th}$ node on the target routing path and the second quantum key corresponding to the $i^{th}$ node on the target routing path, a third quantum key corresponding to the $i^{th}$ node on the target routing path; and sending, by the $i^{th}$ node, the third quantum key corresponding to the $i^{th}$ node on the target routing path to a destination node on the target routing path; or encrypting, by the $i^{th}$ node by using the third quantum key corresponding to the $i^{th}$ node on the target routing path, a first ciphertext received from the $(i-1)$ node on the target routing path, and sending an obtained second ciphertext corresponding to the $i^{th}$ node to the $(i+1)^{th}$ node on the target routing path, where the first ciphertext received by the $i^{th}$ node from the $(i-1)^{th}$ node on the target routing path is a second ciphertext that is sent by the $(i-1)^{th}$ node and that corresponds to the $(i-1)^{th}$ node, and when i is 1, a $0^{th}$ node is a source node on the target routing path, and a second ciphertext corresponding to the source node on the target routing path is obtained by encrypting a to-be-shared quantum key between the source node on the target routing path and the destination node on the target routing path by using a second quantum key corresponding to the source node on the target routing path, wherein a second quantum key corresponding to the $(i-1)^{th}$ node on the target routing path is the same as the first quantum key corresponding to the $i^{th}$ node on the target routing path, and the second quantum key corresponding to the $i^{th}$ node on the target routing path is the same as a first quantum key corresponding to the $(i+1)^{th}$ node on the target routing path.

According to a second aspect, an embodiment of this application provides a quantum key distribution device. The quantum key distribution device includes a memory, a transceiver, and a processor. The memory is configured to store an instruction. The processor is configured to: execute the instruction stored in the memory, and control the transceiver to receive a signal and send a signal. When the processor executes the instruction stored in the memory, the quantum key distribution device is configured to perform the method in any one of the first aspect or the possible implementations of the first aspect.

According to a third aspect, an embodiment of this application provides a quantum key distribution device, configured to implement the method in any one of the first aspect or the possible implementations of the first aspect. The quantum key distribution device includes corresponding functions separately configured to implement steps in the foregoing method. The functions may be implemented by hardware, or may be implemented by hardware executing corresponding software. The hardware or software includes one or more modules corresponding to the foregoing functions.

According to a fourth aspect, an embodiment of this application provides a computer storage medium. The computer storage medium stores an instruction. When the instruction is run on a computer, the computer is enabled to perform the method in any one of the first aspect or the possible implementations of the first aspect.

According to a fifth aspect, an embodiment of this application provides a computer program product including an instruction. When the computer program product is run on a computer, the computer is enabled to perform the method in any one of the first aspect or the possible implementations of the first aspect.

BRIEF DESCRIPTION OF DRAWINGS

FIG. 6 is a schematic diagram in which a node D in FIG. 2 generates, in an implementation a3-1, a first correspondence corresponding to the node D according to an embodiment of this application:

FIG. 7 is a schematic diagram in which a node D in FIG. 2 generates, in an implementation a3-2, a first quantum key corresponding to the node D on a routing path $L_2$ according to an embodiment of this application:

FIG. 8 is a schematic diagram in which a node D in FIG. 2 generates, in an implementation a3-3, a first quantum key corresponding to the node D on a routing path $L_2$ according to an embodiment of this application;

FIG. 9 is a schematic diagram in which a node D in FIG. 2 generates, in an implementation b3-1, a second correspondence corresponding to the node D according to an embodiment of this application:

FIG. 10 is a schematic diagram in which a node E in FIG. 2 generates, in an implementation a3-1, a first correspondence corresponding to the node E according to an embodiment of this application;

FIG. 11 is a schematic diagram in which a node D in FIG. 2 generates, in an implementation b3-2, a second quantum key corresponding to the node D on a routing path $L_2$ according to an embodiment of this application:

FIG. 12 is a schematic structural diagram of a local area network obtained by dividing a quantum communication system according to an embodiment of this application;

DESCRIPTION OF EMBODIMENTS

Figure 1:
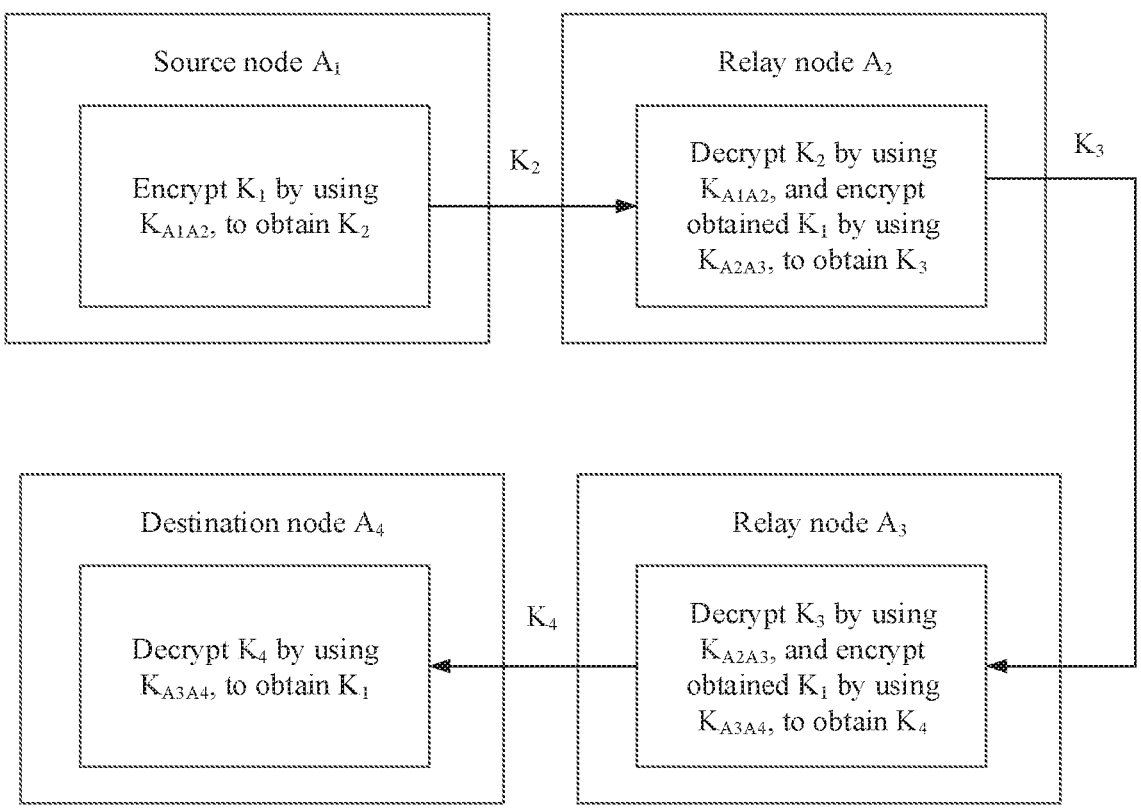
FIG. 1 is a schematic diagram of a quantum key distribution method in the prior art.
Figure 2:
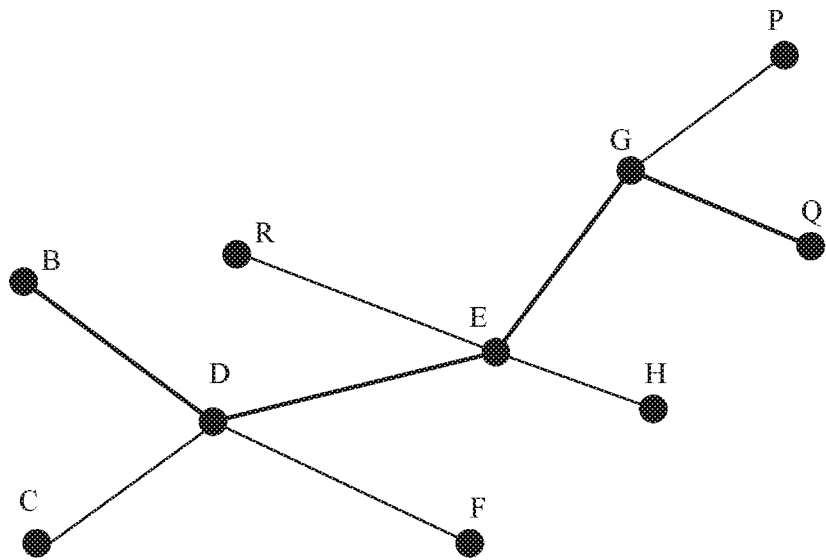
FIG. 2 is a schematic architectural diagram of a quantum communication system according to an embodiment of this application.

FIG. 2 is an example of a schematic architectural diagram of a quantum communication system according to an embodiment of this application. As shown in FIG. 2, the quantum communication system includes a plurality of nodes, for example, a node B, a node C, a node D, a node E, a node F, a node G a node H a node P, a node Q. and a node R. There may be a plurality of routing paths between the plurality of nodes, and a node other than a source node and a destination node on one routing path may be referred to as a relay node. One node may be used as a source node on one routing path and used as a relay node or a destination node on another routing path. FIG. 2 shows several routing paths as an example, which are respectively:

a routing path $L_1$: "source node B→relay node D→relay node E→relay node G→destination node P":

a routing path $L_2$: "source node B→relay node D→relay node E→relay node G→destination node Q";

a routing path $L_3$: "source node B→relay node D→relay node E→destination node H";

a routing path $L_4$: "source node C→relay node D→destination node F":

a routing path $L_5$: "source node B→relay node D→destination node F"; and a routing path $L_6$: "source node R→relay node E→destination node H".

Figure 3:
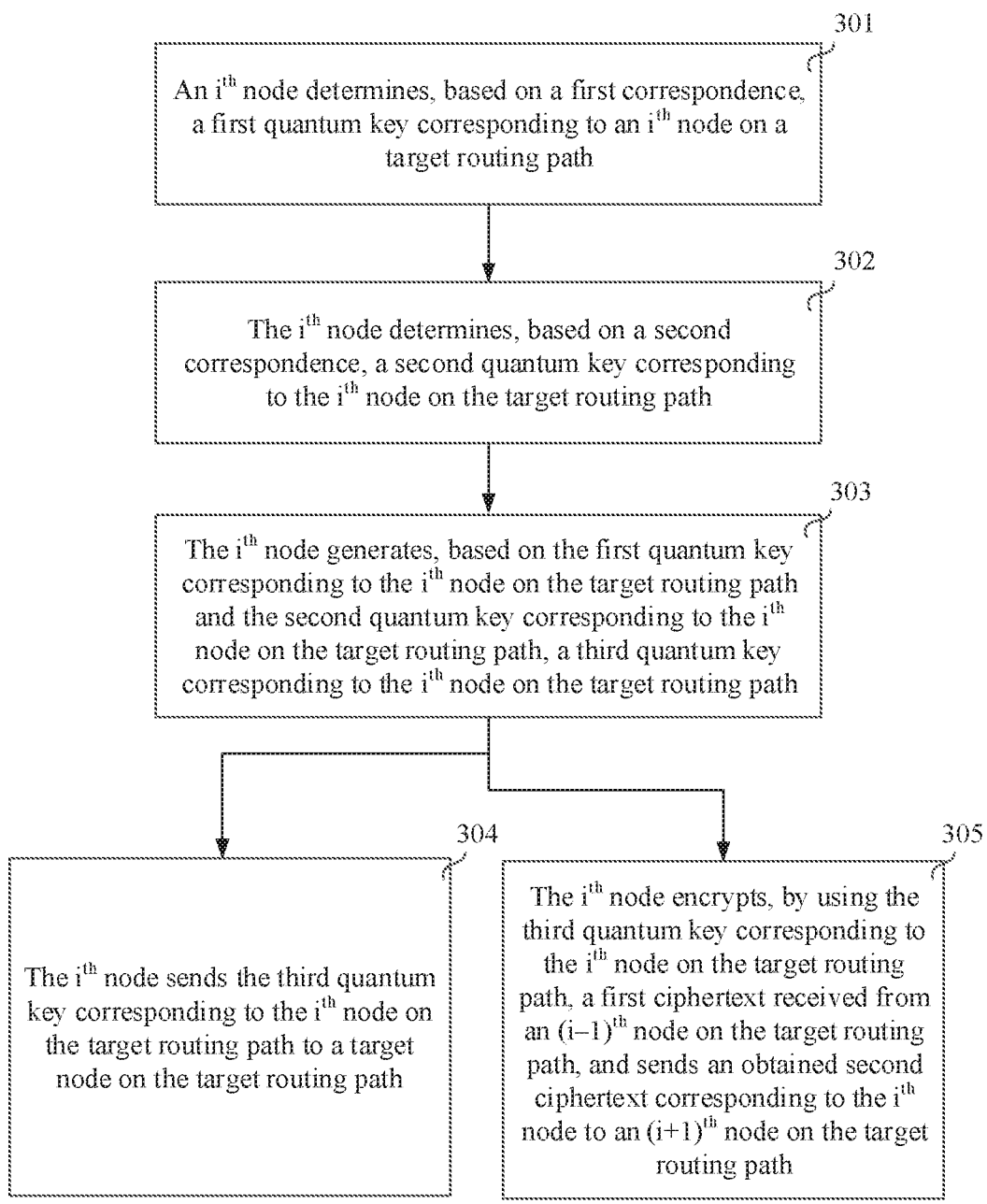
FIG. 3 is a schematic flowchart of a quantum key distribution method according to an embodiment of this application.

Based on the schematic architectural diagram of the quantum communication system shown in FIG. 2, an embodiment of this application provides a quantum key distribution method. FIG. 3 is an example of a schematic flowchart of a quantum key distribution method according to an embodiment of this application. As shown in FIG. 3, the method provided in this embodiment of this application includes the following steps.

Step 301: An $i^{th}$ node determines, based on a first correspondence, a first quantum key corresponding to the $i^{th}$ node on a target routing path. In an optional implementation, the $i^{th}$ node is an $i^{th}$ relay node on the target routing path.

The $i^{th}$ node is the $i^{th}$ node on the target routing path. The first quantum key corresponding to the $i^{th}$ node on the target routing path is a quantum key that is obtained by the $i^{th}$ node and that is shared or to be shared between the $i^{th}$ node and an $(i-1)^{th}$ node on the target routing path. The first correspondence includes a correspondence between each of N routing paths passing through the $i^{th}$ node and each of N first quantum keys corresponding to the $i^{th}$ node, and the N routing paths are in a one-to-one correspondence with the N first quantum keys corresponding to the $i^{th}$ node, where N is a positive integer, and i is a positive integer. The target routing path is any one of the N routing paths. In this embodiment of this application, the target routing path is merely a name for ease of description, and does not constitute a limitation.

Step 302: The $i^{th}$ node determines, based on a second correspondence, a second quantum key corresponding to the $i^{th}$ node on the target routing path.

The second quantum key corresponding to the $i^{th}$ node on the target routing path is a quantum key that is obtained by the $i^{th}$ node and that is shared or to be shared between the $i^{th}$ node and an $(i+1)^{th}$ node on the target routing path. The second correspondence includes a correspondence between each of the N routing paths passing through the $i^{th}$ node and each of N second quantum keys corresponding to the $i^{th}$ node, and the N routing paths are in a one-to-one correspondence with the N second quantum keys corresponding to the $i^{th}$ node.

Step 303: The $i^{th}$ node generates, based on the first quantum key corresponding to the $i^{th}$ node on the target routing path and the second quantum key corresponding to the $i^{th}$ node on the target routing path, a third quantum key corresponding to the $i^{th}$ node on the target routing path. After step 303, this embodiment of this application provides two optional implementations. In one optional implementations, step 304 is performed after step 303. In the other optional implementations, step 305 is performed after step 303. Whether step 304 or step 305 is performed after step 303 may be flexibly selected by a person skilled in the art based on an actual application scenario.

Step 304: The $i^{th}$ node sends the third quantum key corresponding to the $i^{th}$ node on the target routing path to a destination node on the target routing path.

Step 305: The $i^{th}$ node encrypts, by using the third quantum key corresponding to the $i^{th}$ node on the target routing path, a first ciphertext received from the $(i-1)^{th}$ node on the target routing path, and sends an obtained second ciphertext corresponding to the $i^{th}$ node to the $(i+1)^{th}$ node on the target routing path.

The first ciphertext received by the $i^{th}$ node from the $(i-1)^{th}$ node on the target routing path is a second ciphertext that is sent by the $(i-1)^{th}$ node and that corresponds to the $(i-1)^{th}$ node. When i is 1, a $0^{th}$ node is a source node on the target routing path, and a second ciphertext corresponding to the source node on the target routing path is obtained by encrypting a to-be-shared quantum key between the source node on the target routing path and the destination node on the target routing path by using a second quantum key corresponding to the source node on the target routing path.

A second quantum key corresponding to the $(i-1)^{th}$ node on the target routing path is the same as the first quantum key corresponding to the $i^{th}$ node on the target routing path, and the second quantum key corresponding to the $i^{th}$ node on the target routing path is the same as a first quantum key corresponding to the $(i+1)^{th}$ node on the target routing path.

In this embodiment of this application, an algorithm used when the $i^{th}$ node encrypts, by using the third quantum key corresponding to the $i^{th}$ node on the target routing path, the first ciphertext received from the $(i-1)^{th}$ node on the target routing path may be referred to as a first algorithm. In this embodiment of this application, an algorithm used when the third quantum key corresponding to the $i^{th}$ node on the target routing path is generated based on the first quantum key corresponding to the $i^{th}$ node on the target routing path and the second quantum key corresponding to the $i^{th}$ node on the target routing path may be referred to as a second algorithm.

Figure 4:
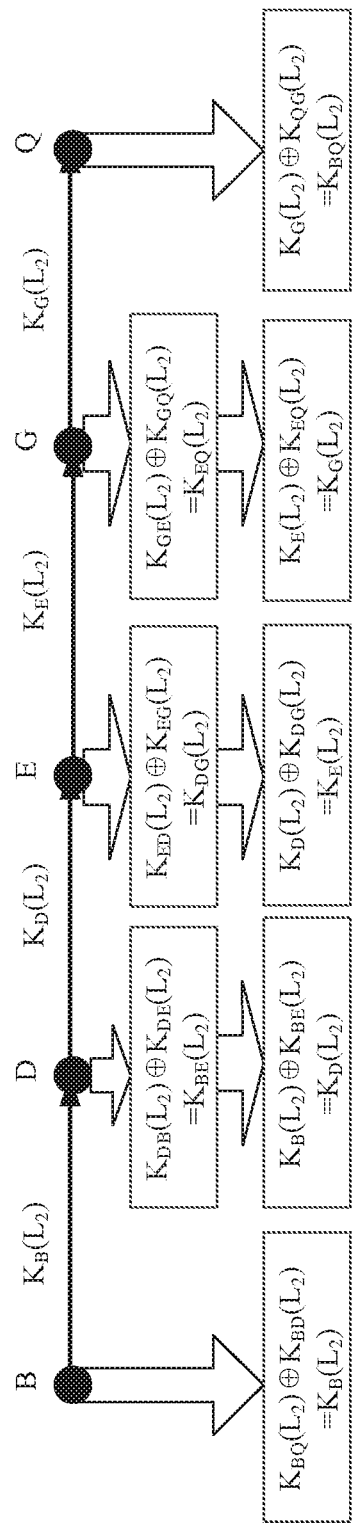
FIG. 4 is a schematic diagram of a quantum key distribution method performed for a routing path $L_2$ in FIG. 2 according to an embodiment of this application.

The quantum key distribution method shown in FIG. 3 is described in detail below by using an example in which the target routing path is the routing path $L_2$ in FIG. 2. FIG. 4 is an example of a schematic diagram of a quantum key distribution method performed for a routing path $L_2$ in FIG. 2. A solution shown in FIG. 4 is used to perform a solution corresponding to step 305. As shown in FIG. 4, a to-be-shared quantum key between the source node B and the destination node Q is $K_{BQ}(L_2)$, and the source node B needs to transmit the to-be-shared quantum key $K_{BQ}(L_2)$ to the destination node Q. A specific procedure is as follows:

As shown in FIG. 4, the source node B obtains the to-be-shared quantum key $K_{BQ}(L_2)$. A second quantum key corresponding to the source node B is a quantum key that corresponds to the source node B on the routing path $L_2$ and that is shared or to be shared between the source node B and the relay node D, where the quantum key is determined by the source node B. In FIG. 4, $K_{BD}(L_2)$ represents the second quantum key corresponding to the source node B on the routing path $L_2$.

The source node B encrypts, by using the second quantum key $K_{BD}(L_2)$ corresponding to the source node B, the to-be-shared quantum key $K_{BQ}(L_2)$ between the source node on the target routing path and the destination node on the target routing path, to obtain a second ciphertext $K_B(L_2)$ corresponding to the source node B. The source node B sends the second ciphertext $K_B(L_2)$ corresponding to the source node to the relay node D. An algorithm used to encrypt $K_{BQ}(L_2)$ by using $K_{BD}(L_2)$ may be referred to as a third algorithm. The third algorithm may be the same as the first algorithm, or may be another algorithm.

Correspondingly, the relay node D receives a first ciphertext $K_B(L_2)$ from the source node B. In other words, the second ciphertext that is sent by the source node B and that corresponds to the source node B is the same as the first ciphertext received by the relay node D. In this embodiment of this application, a first ciphertext received by a relay node may also be referred to as the first ciphertext corresponding to the relay node. For example, the first ciphertext $K_B(L_2)$ received by the relay node D may also be referred to as the first ciphertext $K_B(L_2)$ corresponding to the relay node D. If the target routing path is the routing path $L_2$, and the node D is an $i^{th}$ node on the target routing path, the node B is an $(i-1)^{th}$ node on the target routing path, the node E is an $(i+1)^{th}$ node on the target routing path, and the node G is an $(i+2)^{th}$ node on the target routing path. This is the same for subsequent descriptions, and is not described below. The relay node D generates, based on a first quantum key $K_{DB}(L_2)$ corresponding to the relay node D on the target routing path and a second quantum key $K_{DE}(L_2)$ corresponding to the relay node D on the target routing path, a third quantum key $K_{BE}(L_2)$ corresponding to the relay node D on the target routing path.

Further, the relay node D encrypts, by using the third quantum key $K_{BE}(L_2)$, the received first ciphertext $K_B(L_2)$ corresponding to the relay node D, to obtain a second ciphertext $K_D(L_2)$ corresponding to the relay node D. The relay node D sends the second ciphertext $K_D(L_2)$ corresponding to the relay node D to the relay node E. An algorithm used to encrypt the first ciphertext $K_B(L_2)$ by using the third quantum key $K_{BE}(L_2)$ to generate the second ciphertext $K_D(L_2)$ may be the first algorithm.

Correspondingly, the relay node E receives a first ciphertext $K_D(L_2)$ from the relay node D. In other words, the second ciphertext that is sent by the relay node D and that corresponds to the relay node D is the same as the first ciphertext received by the relay node E. The relay node E generates, based on a first quantum key $K_{ED}(L_2)$ corresponding to the relay node E on the routing path $L_2$ and a second quantum key $K_{EG}(L_2)$ corresponding to the relay node E on the routing path $L_2$, a third quantum key $K_{DG}(L_2)$ corresponding to the relay node E on the routing path $L_2$. Further, the relay node E encrypts the first ciphertext $K_D(L_2)$ by using the third quantum key $K_{DG}(L_2)$, to obtain a second ciphertext $K_E(L_2)$ corresponding to the relay node E. The relay node E sends the second ciphertext $K_E(L_2)$ corresponding to the relay node E to the relay node G.

Correspondingly, the relay node G receives a first ciphertext $K_E(L_2)$ from the relay node E. In other words, the second ciphertext that is sent by the relay node E and that corresponds to the relay node E is the same as the first ciphertext received by the relay node G. The relay node G generates, based on a first quantum key $K_{GE}(L_2)$ corresponding to the relay node G on the routing path $L_2$ and a second quantum key $K_{GQ}(L_2)$ corresponding to the relay node G on the routing path $L_2$, a third quantum key $K_{EQ}(L_2)$ corresponding to the relay node G on the routing path $L_2$. Further, the relay node G encrypts the first ciphertext $K_E(L_2)$ by using the third quantum key $K_{EQ}(L_2)$, to obtain a second ciphertext $K_G(L_2)$ corresponding to the relay node G. The relay node G sends the second ciphertext $K_G(L_2)$ corresponding to the relay node G to the destination node Q.

Further, the destination node Q receives a first ciphertext $K_G(L_2)$ from the relay node G. and $K_G(L_2)$ may be referred to as the first ciphertext corresponding to the destination node Q. The destination node Q decrypts the first ciphertext $K_G(L_2)$ by using a first quantum key $K_{QG}(L_2)$ corresponding to the destination node Q on the routing path $L_2$, to obtain the to-be-shared quantum key $K_{BQ}(L_2)$. An algorithm used for decryption processing may be referred to as a fourth algorithm. The fourth algorithm may be the same as the first algorithm, or may be another algorithm.

For a process in which the destination node decrypts, by using the first quantum key corresponding to the destination node on the target routing path, the first ciphertext corresponding to the destination node, to obtain the to-be-shared quantum key, refer to related descriptions of a formula (1) in the following content.

Figure 5:
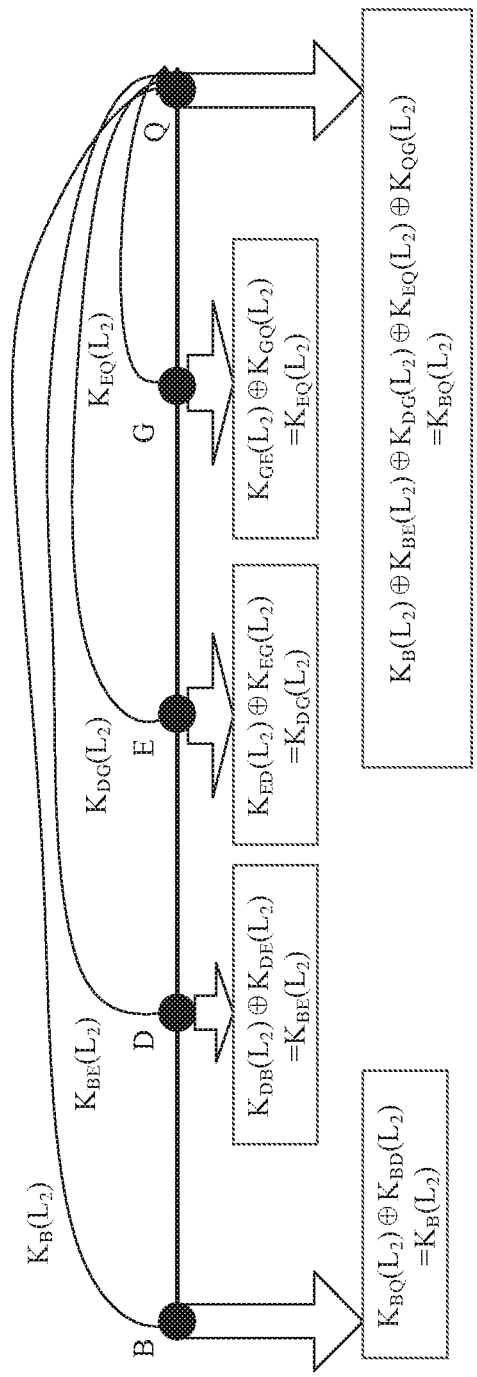
FIG. 5 is a schematic diagram of another quantum key distribution method performed for a routing path $L_2$ in FIG. 2 according to an embodiment of this application.

FIG. 5 is an example of a schematic diagram of another quantum key distribution method performed for a routing path $L_2$ in FIG. 2. The solution shown in FIG. 4 is used to perform a solution corresponding to step 304. As shown in FIG. 5, the source node may send generated $K_B(L_2)$ to the destination node Q by using a typical signal or through a quantum channel. Each relay node also sends a third quantum key correspondingly generated by each relay node to the destination node Q. For example, in FIG. 5, the relay node D sends a generated third quantum key $K_{BE}(L_2)$ corresponding to the relay node D on the routing path $L_2$ to the destination node Q, the relay node E sends a generated third quantum key $K_{DG}(L_2)$ corresponding to the relay node E on the routing path $L_2$ to the destination node Q, and the relay node G sends a generated third quantum key $K_{EQ}(L_2)$ corresponding to the relay node G on the routing path $L_2$ to the destination node Q. The destination node Q encrypts $K_B(L_2)$ by using $K_{BE}(L_2)$, encrypts an obtained result by using $K_{DG}(L_2)$, encrypts an obtained result by using $K_{EQ}(L_2)$, and decrypts an obtained result by using $K_{QG}(L_2)$, to obtain a to-be-shared quantum key $K_{BQ}(L_2)$. It can be learned that, in this solution, each relay node sends the third quantum key to the destination node after obtaining the third quantum key through calculation, so that operation duration of each relay node can be shortened, and quantum key distribution efficiency can be further improved.

The following content can be learned from the examples shown in FIG. 4 and FIG. 5. First, in this embodiment of this application, a relay node does not decrypt information sent by a previous node of the relay node, so that a to-be-shared quantum key between a source node and a destination node is not obtained by a relay node through decryption. This can improve security of the to-be-shared quantum key between the source node and the destination node.

Second, a relay node does not encrypt and decrypt information sent by a previous node of the relay node, so that a time and a resource occupied for performing optical-to-electrical conversion on a to-be-shared quantum key on a routing path can be saved.

Third, in this embodiment of this application, after generating a third quantum key, a relay node may delete a first quantum key and a second quantum key that correspond to the relay node. It can be learned that the relay node may not leave a time window within which an attack is made, so that a capability of an eavesdropper for decrypting a to-be-shared quantum key is deteriorated. This can further improve information transmission security in a quantum key distribution process.

Fourth, related information of a third quantum key corresponding to a relay node may be publicized, so that an information storage security requirement can be lowered. This provides a basis for further publicizing all related attribute information of the relay node. A node may publicize a log including a corresponding operation and a corresponding access status that are generated when the node is used as a relay node on a routing path, and a resource utilization status of the node. In this process, an intermediate step of obtaining a third quantum key corresponding to the relay node through calculation and a related information result used in the intermediate step cannot be publicized. In this embodiment of this application, the relay node may publicize related information of the relay node, for example, a log including an operation and an access status of the relay node. This can help analyze a network running status, and further improves transparency to a customer.

In this embodiment of this application, the second quantum key corresponding to the $(i-1)^{th}$ node on the target routing path is the same as the first quantum key corresponding to the $i^{th}$ node on the target routing path, and the second quantum key corresponding to the $i^{th}$ node on the target routing path is the same as the first quantum key corresponding to the $(i+1)^{th}$ node on the target routing path. For example, in FIG. 4, $K_{BD}(L_2)$ is the same as $K_{DB}(L_2)$. $K_{DE}(L_2)$ is the same as $K_{ED}(L_2)$, $K_{EG}(L_2)$ is the same as $K_{GE}(L_2)$, and $K_{GQ}(L_2)$ is the same as $K_{QG}(L_2)$. Therefore, the destination node can obtain the to-be-shared quantum key through decryption.

In FIG. 4 and FIG. 5, an example in which both the first algorithm and the second algorithm are exclusive OR algorithms is used for description. A person skilled in the art may learn that the first algorithm and the second algorithm may alternatively be other algorithms. In step 303, an algorithm used when the third quantum key corresponding to the $i^{th}$ node on the target routing path is generated based on the first quantum key corresponding to the $i^{th}$ node on the target routing path and the second quantum key corresponding to the $i^{th}$ node on the target routing path is the second algorithm, and an algorithm used when the $i^{th}$ node encrypts, by using the third quantum key corresponding to the $i^{th}$ node on the target routing path, the first ciphertext received from the $(i-1)^{th}$ node on the target routing path is the first algorithm.

In an optional implementation, the first algorithm meets the formula (1):

$$g(f_E(K_{i-1,i-2}(L_j), K_{i-1,i}(L_j)), f_E(K_{i,i-1}(L_j), K_{i,i+1}(L_j))) = f_E(K_{i-1,i-2}(L_j), K_{i,i+1}(L_j))$$

In the formula (1), $L_j$ is an identifier of the target routing path;

$K_{i-1,i-2}(L_j)$ is a first quantum key corresponding to the $(i-1)^{th}$ node on the target routing path $L_j$;

$K_{i-1,i}(L_j)$ is the second quantum key corresponding to the $(i-1)^{th}$ node on the target routing path $L_j$;

$K_{i,i-1}(L_j)$ is the first quantum key corresponding to the $i^{th}$ node on the target routing path $L_j$;

$K_{i,j+1}(L_j)$ is the second quantum key corresponding to the $i^{th}$ node on the target routing path;

$f_E(\cdot)$ is a function corresponding to the second algorithm, where the second algorithm is an algorithm used when the third quantum key corresponding to the $i^{th}$ node on the target routing path is generated based on the first quantum key corresponding to the $i^{th}$ node on the target routing path and the second quantum key corresponding to the $i^{th}$ node on the target routing path; and $g(\cdot)$ is a function corresponding to the first algorithm.

With reference to FIG. 4, for example, when the $i^{th}$ node is the relay node E, the foregoing formula (1) may be correspondingly expressed as follows:

$$g(f_E(K_{DB}(L_2),K_{DE}(L_2)),f_E(k_{ED}(L_2),K_{EG}(L_2)))=f_E(K_{EG}(L_2),K_{EG}(L_2)).$$

Herein, $f_E(K_D(L_2),K_E(L_2))$ means that an operation corresponding to the second algorithm is performed on the first quantum key $K_{DB}(L_2)$ corresponding to the relay node D on the routing path $L_2$ and the second quantum key $K_{DE}(L_2)$ corresponding to the relay node D on the routing path $L_2$, and a calculation result of $f_E(K_{DB}(L_2),K_{DE}(L_2))$ is the third quantum key $K_{BE}(L_2)$, shown in FIG. 4, corresponding to the relay node D on the routing path $L_2$.

$f_E(K_{ED}(L_2),K_{EG}(L_2))$ means that an operation corresponding to the second algorithm is performed on the first quantum key $K_{ED}(L_2)$ corresponding to the relay node E on the routing path $L_2$ and the second quantum key $K_{EG}(L_2)$ corresponding to the relay node E on the routing path $L_2$, and a calculation result of $f_E(K_{ED}(L_2),K_{EG}(L_2))$ is the third quantum key $K_{DG}(L_2)$, shown in FIG. 4, corresponding to the relay node E on the routing path $L_2$.

$g(f_D(K_{DB}(L_2),K_{DE}(L_2)),f_E(K_{EG}(L_2),K_{EG}(L_2)))$ means that an operation corresponding to the first algorithm is performed on the third quantum key $K_{BE}(L_2)$ corresponding to the relay node D on the routing path $L_2$ and the third quantum key $K_{DG}(L_2)$ corresponding to the relay node E on the routing path $L_2$, and when $K_{DE}(L_2)$ is the same as $K_{ED}(L_2)$, a result of $g(f_E(K_{DB}(L_2),K_{DE}(L_2)),f_E(K_{ED}(L_2),K_{EG}(L_2)))$ is $f_E(K_{DB}(L_2),K_{EG}(L_2))$.

When the foregoing formula (1) is used, with reference to a calculation manner of a third quantum key corresponding to each node in FIG. 4 and a calculation manner of a second ciphertext corresponding to each node in FIG. 4, descriptions are provided as an example with reference to FIG. 4. An operation performed by the destination node Q may be expressed by using the following formula (2):

$$\begin{aligned}K_G(L_2) \oplus K_{QG}(L_2) &= [K_E(L_2) \oplus K_{EQ}(L_2)] \oplus K_{QG}(L_2) \\ &= [K_D(L_2) \oplus K_{DG}(L_2)] \oplus K_{EQ}(L_2) \oplus K_{QG}(L_2) \\ &= [K_B(L_2) \oplus K_{BE}(L_2)] \oplus \\ &\quad K_{DG}(L_2) \oplus K_{EQ}(L_2) \oplus K_{QG}(L_2) \\ &= [K_{BQ}(L_2) \oplus K_{BD}(L_2)] \oplus K_{BE}(L_2) \oplus \\ &\quad K_{DG}(L_2) \oplus K_{EQ}(L_2) \oplus K_{QG}(L_2) \\ &= [K_{BQ}(L_2) \oplus K_{BD}(L_2)] \oplus [K_{BD}(L_2) \oplus \\ &\quad K_{DE}(L_2)] \oplus [K_{ED}(L_2) \oplus K_{EG}(L_2)] \oplus \\ &\quad [K_{GE}(L_2) \oplus K_{GQ}(L_2)] \oplus K_{QG}(L_2) \\ &= K_{BQ}(L_2)\end{aligned}$$

It can be learned from the formula (2) that, after performing an operation on the received first ciphertext $K_G(L_2)$, the destination node may obtain the to-be-shared quantum key. A person skilled in the art may learn that, in an actual operation, the destination node may not perform the detailed calculation shown in the foregoing formula (2), but performs, by using $K_{QG}(L_2)$, only the operation corresponding to the first algorithm on received $K_G(L_2)$.

In FIG. 4 and FIG. 5, only an example in which the first algorithm, the second algorithm, the third algorithm, and the fourth algorithm are all exclusive OR algorithms is used for description. In a specific implementation process, the first algorithm, the second algorithm, the third algorithm, and the fourth algorithm are implemented in a plurality of manners. For example, two first algorithms correspondingly used by two nodes are two different algorithms, or two second algorithms correspondingly used by two nodes are two different algorithms.

For example, $f_E(\cdot)$ may be a function set, may include a series of encryption functions $\{f_{E0}, f_{E1} \ldots\}$, and may further include a decryption function $f_D$. $f_{E0}$ is the foregoing third algorithm used to encrypt a to-be-shared quantum key between the source node and the destination node, and $f_{E1}$, $f_{E2} \ldots$ is a function used by each relay node to calculate a third quantum key and encrypt a received first ciphertext. In other words, a function corresponding to the first algorithm is the same as a function corresponding to the second algorithm (for example, $f_{E1}$ is a function used by the first relay node on a routing path to calculate a third quantum key corresponding to the first relay node and encrypt a received first ciphertext). $f_D$ is the fourth algorithm. In other words, the destination node decrypts a received first ciphertext, to obtain a to-be-shared quantum key. Any two functions in $\{f_{E0}, f_{E1} \ldots\}$ and $f_D$ may be the same or may be different. This is not limited in this embodiment of this application.

It can be learned from the foregoing example that, in this embodiment of this application, when a quantum key shared or to be shared between two adjacent nodes used in a quantum key distribution process is unknown (for example, a quantum key shared or to be shared between the destination node and a previous node of the destination node is unknown), the to-be-shared quantum key cannot be obtained through calculation by using obtained third quantum keys of some or all nodes and an obtained second ciphertext sent by the source node, so that security of the quantum key distribution process can be improved.

An optional implementation of the first algorithm and the second algorithm is further enumerated in this embodiment of this application. For example, the second algorithm may be defined as an operation of performing modulo 4 subtraction on every two bits. Details are as follows:

For example, for any function in $\{f_{E0}, f_{E1} \ldots\}$ in the function set $f_E(\cdot)$, an input is two binary sequences whose lengths each are 2n, for example, $X=x_1x_2 \ldots x_{2k-1}x_{2k} \ldots x_{2n-1}x_{2n}$, $Y=y_1y_2 \ldots y_{2k-1}y_{2k} \ldots y_{2n-1}y_{2n}$, and an output is still one binary sequence whose length is 2n, for example, $Z=z_1z_2 \ldots z_{2k-1}z_{2k} \ldots z_{2n-1}z_n=f_E(X,Y)$. In this case, $z_{2k-1}z_{2k}$ may be obtained by using the following calculation method:

calculating a function "$a_k=2x_{2k-1}+x_{2k}$, $b_k=2y_{2k-1}+y_{2k}$"; and if $a_k \geq b_k$, determining that $z_{2k-1}z_{2k}$ is a binary representation of $a_k-b_k$;

or if $a_k<b_k$, determining that $z_{2k-1}z_{2k}$ is a binary representation of $a_k-b_k+4$.

However, the decryption function $f_D$ may be an operation of performing modulo 4 addition on every two bits, and it is not difficult to verify that the function in this example may also meet the foregoing implementations. It should be further noted that the foregoing formula (1) is not a necessary and sufficient condition for meeting the solution provided in this embodiment of this application, but is only a sufficient condition. Alternatively, there may be another form of function that meets a mathematical feature in the foregoing embodiment. This is not limited in this embodiment of this application.

The communications system applicable to this embodiment of this application may include a plurality of routing paths. If N is an integer greater than 1, for a first routing path and a second routing path in N routing paths passing through an $i^{th}$ node, a first quantum key corresponding to the $i^{th}$ node on the first routing path is different from a first quantum key corresponding to the $i^{th}$ node on the second routing path, and a second quantum key corresponding to the $i^{th}$ node on the first routing path is different from a second quantum key corresponding to the $i^{th}$ node on the second routing path. The first routing path and the second routing path are two different routing paths in the N routing paths. As shown in FIG. 2, there are five routing paths passing through the relay node D, and for any two of the five routing paths, for example, the routing path $L_1$ and the routing path $L_5$, a first quantum key corresponding to the relay node D on the routing path $L_1$ is different from a first quantum key corresponding to the relay node D on the routing path $L_5$, and a second quantum key corresponding to the relay node D on the routing path $L_1$ is different from a second quantum key corresponding to the relay node D on the routing path $L_5$. In other words, for each routing path, a node distributes a corresponding quantum key to the routing path, to implement a one time system, so that quantum key distribution security can be further improved. In addition, this embodiment of this application is applicable to a multipath case, and a network to which this embodiment of this application is applied may be more complex.

In actual application, the quantum communication system continuously generates quantum keys to push the quantum keys to a key management layer. Therefore, each quantum key may be numbered, and the number corresponding to the quantum key may also be referred to as an identifier corresponding to the quantum key. For example, in FIG. 2, quantum keys $K_{DE}$ are continuously generated between the node D and the node E, a length of a quantum key may be 256 bits, and a number of each quantum key corresponds to one 256-bit quantum key. There are a plurality of routing paths passing through the node D and the node E, for example, the routing path $L_1$, the routing path $L_2$, and the routing path $L_3$ shown in FIG. 2. In this case, the node D and the node E need to separately distribute the quantum keys generated between the node D and the node E to the routing path $L_1$, the routing path $L_2$, and the routing path $L_3$. In this embodiment of this application, a second quantum key distributed by the node D to a routing path and a first quantum key distributed by the node E to the routing path need to be a same quantum key. For example, a second quantum key distributed by the node D to the routing path $L_1$ and a first quantum key distributed by the node E to the routing path $L_1$ need to be a same quantum key. To meet this requirement, the first correspondence may be obtained before step 301, and the second correspondence may be obtained before step 302. The first correspondence and the second correspondence may be represented in a plurality of forms, for example, in a table form or in a text form. This is not limited in this embodiment of this application. The following content is described by using a table form as an example.

The first correspondence in step 301 and the second correspondence in step 302 may be obtained in a plurality of manners. The following describes several manners of obtaining the first quantum key corresponding to the $i^{th}$ node on the target routing path in the first correspondence: an optional implementation a1, an optional implementation a2, and an optional implementation a3.

In the implementation a1, indication information used to indicate the first quantum key corresponding to the $i^{th}$ node on the target routing path in the first correspondence is delivered by a centralized controller.

The $i^{th}$ node receives the indication information that is sent by the centralized controller and that is used to indicate the first quantum key corresponding to the $i^{th}$ node on the target routing path. In this embodiment of this application, the indication information used to indicate the first quantum key corresponding to the $i^{th}$ node on the target routing path may be directly the first quantum key corresponding to the $i^{th}$ node on the target routing path, or may be other information that can indicate the correspondence. Optionally, the $i^{th}$ node receives indication information that is sent by the centralized controller and that is used to indicate the second quantum key corresponding to the $i^{th}$ node on the target routing path. The centralized controller may collect service requests in an entire network, and may better calculate a routing path in the entire network. Subsequently, the centralized controller may calculate a first correspondence corresponding to each node, and then deliver the first correspondence to each node.

In the implementation a2, indication information used to indicate the first quantum key corresponding to the $i^{th}$ node on the target routing path in the first correspondence is sent by the $(i-1)^{th}$ node on the target routing path.

In this implementation, the $(i-1)^{th}$ node on the target routing path may obtain the second quantum key corresponding to the $(i-1)^{th}$ node on the target routing path through calculation, and then send the second quantum key to the $i^{th}$ node. Because the second quantum key corresponding to the $(i-1)^{th}$ node on the target routing path is the same as the first quantum key corresponding to the $i^{th}$ node on the target routing path, the $i^{th}$ node may learn of the first quantum key corresponding to the $i^{th}$ node on the target routing path in the first correspondence.

Based on this implementation, in an optional implementation, each node (other than the destination node) on the target routing path obtains a second quantum key corresponding to each node on the target routing path through calculation, and then sends the second quantum key corresponding to each node on the target routing path to a next node of each node on the target routing path. Because the second quantum key corresponding to each node on the target routing path is the same as a first quantum key corresponding to the next node of each node on the target routing path, the $i^{th}$ node on the target routing path may obtain, in the implementation a2, the first quantum key corresponding to the $i^{th}$ node on the target routing path in the first correspondence.

In the implementation a3, the $i^{th}$ node determines, based on obtained network topology information of the quantum communication system and a first preset rule, the first quantum key corresponding to the $i^{th}$ node on the target routing path.

For the implementation a3, there may be a plurality of implementations in which the $i^{th}$ node determines, based on the obtained network topology information of the quantum communication system and the first preset rule, the first quantum key corresponding to the $i^{th}$ node on the target routing path. The following describes an optional implementation a3-1, an optional implementation a3-2, and an optional implementation a3-3.

Implementation a3-1

The $i^{th}$ node determines, based on a ranking relationship between numbers of a plurality of $(i-1)^{th}$ nodes on the N routing paths passing through the $i^{th}$ node, a ranking relationship between numbers of N $(i+1)^{th}$ nodes on a plurality of routing paths passing through the $i^{th}$ node, and a ranking relationship between numbers of the N routing paths passing through the $i^{th}$ node, a ranking of the plurality of routing paths passing through the $i^{th}$ node, and determines, based on the ranking of the plurality of routing paths, the first quantum key corresponding to the $i^{th}$ node on the target routing path.

FIG. 6 is an example of a schematic diagram in which the node D in FIG. 2 generates, in the implementation a3-1, a first correspondence corresponding to the node D. As shown in FIG. 6, in the six routing paths shown in FIG. 2, each node has a global number. Optionally, there may be a ranking relationship between global numbers of the nodes. For example, the global numbers of the nodes may be represented by Arabic numerals, letters, or some characters having a preset ranking relationship. In FIG. 2, it is assumed that letters corresponding to the nodes are ranked in a letter ranking sequence in an alphabet. As shown in FIG. 6, all paths on which the node D is used as a relay node are the routing path $L_1$ to the routing path $L_5$, and previous-hop nodes of the node D on the five routing paths are first ranked. As shown in FIG. 6, there are two previous-hop nodes of the node D: the node B and the node C. and a ranking result is shown in the second column in FIG. 6.

Further, next-hop nodes of the node D on four routing paths on which the previous-hop node of the node D is the node B are ranked. As shown in FIG. 6, when the previous-hop node of the node D is the node B, the next-hop nodes of the node D are the node E and the node F, and a ranking result is shown in the second row to the fifth row in the third column in FIG. 6. The next-hop node of the node D on the routing path $L_4$ on which the previous-hop node of the node D is the node C is ranked. As shown in FIG. 6, when the previous-hop node of the node D is the node C, the next-hop node of the node D is the node F, and a ranking result is shown in the sixth row in the third column in FIG. 6.

Further, when there are a plurality of routing paths passing through a same previous-hop node of the node D and a same next-hop node of the node D, the plurality of routing paths may be ranked based on global numbers of the routing paths. Optionally, each routing path may have a global number, and there may be a ranking relationship between the numbers of the routing paths. It is assumed that global numbers of the six routing paths in FIG. 2 are ranked from $L_1$ to $L_6$. As shown in FIG. 6, there are three routing paths passing through the node B, the node D, and the node E: the routing path $L_1$, the routing path $L_2$, and the routing path $L_3$, and the routing path $L_1$, the routing path $L_2$, and the routing path $L_3$ are ranked in the second row to the fourth row in the fourth column based on a ranking relationship between global numbers of the routing path $L_1$, the routing path $L_2$, and the routing path $L_3$. There is only one routing path passing through the node B, the node D, and the node F, and the routing path is ranked in the fifth row in the third column in FIG. 6. There is also only one routing path passing through the node C, the node D. and the node F, and the routing path is ranked in the sixth row in the fourth column in FIG. 6.

It can be learned from FIG. 6 that the node D has ranked all routing paths passing through the node D, and then may sequentially distribute quantum keys to the routing paths based on the ranking relationship. As shown in the fourth column in FIG. 6, the second row and the third row in the fourth column in FIG. 6 are used as an example for description. A first quantum key distributed by the node D to the routing path $L_1$ is $K_{DB}(L)$, and a first quantum key distributed by the node D to the routing path $L_2$ is $K_{DB}(L_2)$.

Optionally, because consumption of a quantum key on a specific routing path may be relatively high, a weight may be set for each routing path based on consumption of a quantum key on each routing path and/or service attribute information, to determine a quantity of quantum keys distributed to each routing path in each quantum key distribution period. In other words, $K_{DB}(L)$ is only an identifier corresponding to the first quantum key distributed by the node D to the routing path $L_1$. When only one quantum key is distributed to the routing path $L_1$ in one quantum key distribution period, assuming that a length of a quantum key is 256 bits, $K_{DB}(L_1)$ may be an identifier corresponding to a 256-bit quantum key in each quantum key distribution period. If a plurality of (for example, three) quantum keys are distributed to the routing path $L_1$ in one quantum key distribution period, assuming that a length of a quantum key is 256 bits, $K_{DB}(L_1)$ may be identifiers corresponding to the three 256-bit quantum keys in each quantum key distribution period.

During specific implementation, routing paths are flexibly ranked. FIG. 6 only shows a possible implementation, and there may be another implementation. For example, a plurality of $(i+1)^{th}$ nodes are first ranked based on a ranking relationship between numbers of the plurality of $(i+1)^{th}$ nodes on a plurality of routing paths passing through the $i^{th}$ node, then a plurality of $(i-1)^{th}$ nodes are ranked based on a ranking relationship between numbers of the plurality of $(i-1)^{th}$ nodes on the plurality of routing paths passing through the $i^{th}$ node, and finally the plurality of routing paths are ranked based on a ranking relationship between numbers of the plurality of routing paths passing through the $i^{th}$ node. Details are not described herein.

Implementation a3-2

The $i^{th}$ node determines, based on a ranking relationship between numbers of a plurality of $(i+1)^{th}$ nodes on the N routing paths passing through the $i^{th}$ node, and a ranking relationship between numbers of the N routing paths passing through the $i^{th}$ node, a ranking of a plurality of routing paths passing through the $i^{th}$ node, and determines, based on the ranking of the plurality of routing paths, the first quantum key corresponding to the $i^{th}$ node on the target routing path.

FIG. 7 is an example of a schematic diagram in which the node D in FIG. 2 generates, in the implementation a3-2, a first quantum key corresponding to the node D on the routing path $L_2$. As shown in FIG. 7, in this example, a plurality of routing paths passing through the node D may be first determined: the routing path $L_1$, the routing path $L_2$, the routing path $L_3$, the routing path $L_4$, and the routing path $L_5$. Then, next-hop nodes of the node D on the routing path $L_1$, the routing path $L_2$, the routing path $L_3$, the routing path $L_4$, and the routing path $L_5$ may be ranked, where a ranking result is shown in the second row to the sixth row in the second column in FIG. 7, and the next-hop nodes on the plurality of routing paths passing through the node D are the node E and the node F. Next, the routing path $L_1$, the routing path $L_2$, the routing path $L_3$, the routing path $L_4$, and the routing path $L_5$ are ranked based on numbers of the routing paths, where a ranking result is shown in the second row to the sixth row in the third column in FIG. 7. Finally, first quantum keys corresponding to the node D on all the routing paths are sequentially distributed to all the routing paths based on the ranking of the routing path $L_1$, the routing path $L_2$, the routing path $L_3$, the routing path $L_4$, and the routing path $L_5$.

Implementation a3-3

The $i^{th}$ node determines, based on a ranking relationship between numbers of the N routing paths passing through the $i^{th}$ node, a ranking of the N routing paths passing through the $i^{th}$ node, and determines, based on the ranking of the N routing paths, the first quantum key corresponding to the $i^{th}$ node on the target routing path.

FIG. 8 is an example of a schematic diagram in which the node D in FIG. 2 generates, in the implementation a3-3, a first quantum key corresponding to the node D on the routing path $L_2$. As shown in FIG. 8, a plurality of routing paths passing through the node D may be first determined: the routing path $L_1$, the routing path $L_2$, the routing path $L_3$, the routing path $L_4$, and the routing path $L_5$. Then, the routing path $L_1$, the routing path $L_2$, the routing path $L_3$, the routing path $L_4$, and the routing path $L_5$ are ranked based on numbers of the routing paths, where a ranking result is shown in the second row to the sixth row in the second column in FIG. 8. Finally, corresponding first quantum keys are sequentially distributed to all the routing paths based on the ranking of the routing path $L_1$, the routing path $L_2$, the routing path $L_3$, the routing path $L_4$, and the routing path $L_5$.

In this embodiment of this application, several manners of obtaining the second quantum key corresponding to the $i^{th}$ node on the routing path in the second correspondence are described: an optional implementation b1, an optional implementation b2, and an optional implementation b3.

In the implementation b1, indication information used to indicate the second quantum key corresponding to the $i^{th}$ node on the routing path in the second correspondence is delivered by the centralized controller.

In this embodiment of this application, the indication information used to indicate the second quantum key corresponding to the $i^{th}$ node on the routing path in the second correspondence may be directly the second quantum key corresponding to the $i^{th}$ node on the target routing path, or may be other information that can indicate the correspondence. Optionally, the $i^{th}$ node receives indication information that is sent by the centralized controller and that is used to indicate the first quantum key corresponding to the $i^{th}$ node on the target routing path. The centralized controller may collect service requests in an entire network, and may better calculate a routing path in the entire network. Subsequently, the centralized controller may calculate a second correspondence corresponding to each node, and then deliver the second correspondence to each node.

In the implementation b2, indication information used to indicate the second quantum key corresponding to the $i^{th}$ node on the routing path in the second correspondence is sent by the $(i+1)^{th}$ node on the target routing path.

In this implementation, the $(i+1)^{th}$ node corresponding to the target routing path may obtain a first quantum key corresponding to the $(i+1)^{th}$ node on the target routing path through calculation, and then send the first quantum key to the $i^{th}$ node. Because the first quantum key corresponding to the $(i+1)^{th}$ node on the target routing path is the same as the second quantum key corresponding to the $i^{th}$ node on the target routing path, the $i^{th}$ node may learn of the second quantum key corresponding to the $i^{th}$ node on the target routing path in the second correspondence.

Based on this implementation, in an optional implementation, each node (other than the source node) on the target routing path obtains a first quantum key corresponding to each node on the target routing path through calculation, and then sends the first quantum key corresponding to each node on the target routing path to a previous node of each node on the target routing path. Because the first quantum key corresponding to each node on the target routing path is the same as a second quantum key corresponding to the previous node of each node on the target routing path, the node on the target routing path may obtain, in the implementation b2, the second quantum key corresponding to the $i^{th}$ node on the routing path in the second correspondence.

In the implementation b3, the $i^{th}$ node determines, based on the obtained network topology information of the quantum communication system and a second preset rule, the second quantum key corresponding to the $i^{th}$ node on the target routing path.

For the implementation b3, there may be a plurality of implementations in which the $i^{th}$ node determines, based on the obtained network topology information of the quantum communication system and the second preset rule, the second quantum key corresponding to the $i^{th}$ node on the target routing path. The following describes an optional implementation b3-1 and an optional implementation b3-2.

Implementation b3-1

The $i^{th}$ node determines, based on a ranking relationship between numbers of a plurality of $(i+2)^{th}$ nodes on a plurality of routing paths passing through the $i^{th}$ node and the $(i+1)^{th}$ node on the target routing path, and a ranking relationship between numbers of the plurality of routing paths passing through the $i^{th}$ node and the $(i+1)^{th}$ node on the target routing path, a ranking of the plurality of routing paths passing through the $i^{th}$ node and the $(i+1)^{th}$ node on the target routing path, and determines, based on the ranking of the plurality of routing paths, the second quantum key corresponding to the $i^{th}$ node on the target routing path.

FIG. 9 is an example of a schematic diagram in which the node D in FIG. 2 generates, in the implementation b3-1, a second correspondence corresponding to the node D. As shown in FIG. 9, assuming that a quantum key shared or to be shared between the node D and the node E needs to be determined, all routing paths passing through the node D and the node E need to be first determined. As shown in FIG. 2, all the routing paths passing through the node D and the node E are the routing path $L_1$, the routing path $L_2$, and the routing path $L_3$. Then, next-hop nodes of the node E on the routing path $L_1$, the routing path $L_2$, and the routing path $L_3$ may be ranked, and a ranking result is shown in the second row to the fourth row in the second column in FIG. 6. There are two next-hop nodes of the node E on the routing path $L_1$, the routing path $L_2$, and the routing path $L_3$: the node G and the node H. Subsequently, a plurality of routing paths on which the next-hop node of the node E is the node G are ranked based on numbers of the plurality of routing paths, and a ranking result is shown in the second row to the third row in the third column in FIG. 9. There is only one routing path on which the next-hop of the node E is the node H, and the routing path may be ranked in the fourth row in the third column in FIG. 9. Finally, second quantum keys corresponding to the node D on all the routing paths are sequentially distributed to all the routing paths based on the ranking of the routing path $L_1$, the routing path $L_2$, and the routing path $L_3$.

It can be learned that, in the implementation b3-1, a plurality of routing paths passing through the $i^{th}$ node and the $(i+1)^{th}$ node on the target routing path are first selected, and then these routing paths are ranked.

FIG. 10 is an example of a schematic diagram in which the node E in FIG. 2 generates, in the implementation a3-1, a first correspondence corresponding to the node E. As shown in FIG. 10, all routing paths passing through the node E are the routing path $L_1$, the routing path $L_2$, the routing path $L_3$, and the routing path $L_6$. Previous-hop nodes of the node E on the four routing paths are first ranked. As shown in FIG. 10, there are two previous-hop nodes of the node E: the node D and the node R, and a ranking result is shown in the second column in FIG. 10.

Further, next-hop nodes of the node E on three routing paths on which the previous-hop node of the node E is the node D are ranked. As shown in FIG. 10, when the previous-hop node of the node E is the node D, the next-hop nodes of the node E are the node G and the node H, and a ranking result is shown in the second row to the fourth row in the third column in FIG. 10. A next-hop node of the node E on a routing path on which the previous-hop node of the node E is the node R is ranked. As shown in FIG. 10, when the previous-hop node of the node E is the node R, the next-hop node of the node E is the node H, and a ranking result is shown in the fifth row in the third column in FIG. 10.

Further, as shown in FIG. 10, there are two routing paths passing through the node D, the node E, and the node G: the routing path $L_1$ and the routing path $L_2$, and the routing path $L_1$ and the routing path $L_2$ are ranked in the second row and the third row in the fourth column based on a ranking relationship between global numbers of the routing path $L_1$ and the routing path $L_2$. There is only one routing path passing through the node D, the node E, and the node H, and the routing path is ranked in the fourth row in the fourth column in FIG. 10. There is also only one routing path passing through the node R, the node E, and the node H, and the routing path is ranked in the fifth row in the third column in FIG. 10.

It can be learned from FIG. 10 that the node E has ranked all the routing paths passing through the node E. and then may distribute, based on the ranking relationship, first quantum keys corresponding to the node E on all the routing paths to all the routing paths.

It can be learned from FIG. 9 and FIG. 10 that content of the second column and the third column in FIG. 9 is consistent with content of the second row to the fourth row in the third column and the fourth column in FIG. 10. In other words, a rule in which the node D determines a second quantum key that is between the node D and the node E and that corresponds to the node D is the same as a rule in which the node E determines a first quantum key between the node E and the node D. Therefore, it can be ensured that the second quantum key corresponding to the $i^{th}$ node on the target routing path is the same as the first quantum key corresponding to the $(i+1)^{th}$ node on the target routing path.

Implementation b3-2

The $i^{th}$ node determines, based on a ranking relationship between numbers of a plurality of routing paths passing through the $i^{th}$ node and the $(i+1)^{th}$ node on the target routing path, a ranking of the plurality of routing paths passing through the $i^{th}$ node and the $(i+1)^{th}$ node on the target routing path, and determines, based on the ranking of the plurality of routing paths, the second quantum key corresponding to the $i^{th}$ node in the target routing path.

FIG. 11 is an example of a schematic diagram in which the node D in FIG. 2 generates, in the implementation b3-2, a second quantum key corresponding to the node D on the routing path $L_2$. As shown in FIG. 11, assuming that the second quantum key corresponding to the node D on the routing path $L_2$ needs to be determined, a plurality of routing paths passing through the node D and the node E may be first determined: the routing path $L_1$, the routing path $L_2$, and the routing path $L_3$. Then, the routing path $L_1$, the routing path $L_2$, and the routing path $L_3$ may be ranked based on numbers of the routing paths, and a ranking result is shown in the second row to the fourth row in FIG. 11. Finally, corresponding first quantum keys are distributed to all the routing paths based on the ranking of the routing path $L_1$, the routing path $L_2$, and the routing path $L_3$.

It can be learned that, compared with the implementation b3-1, in the implementation b3-2, a plurality of routing paths passing through the $i^{th}$ node and the $(i+1)^{th}$ node on the target routing path are first selected, and then the plurality of routing paths are directly ranked based on numbers of the plurality of routing paths passing through the $i^{th}$ node and the $(i+1)^{th}$ node on the target routing path. However, in the implementation b3-1, the next-hop nodes of the node E on plurality of routing paths are first ranked, and then the plurality of routing paths are ranked based on numbers of the plurality of routing paths.

In the foregoing implementations, FIG. 6 to FIG. 11 only show an example of a possible implementation. Specifically, in actual application, there may be a plurality of possible implementations. For example, in an optional implementation, the $i^{th}$ node determines, based on a ranking relationship between numbers of a plurality of $(i+1)^{th}$ nodes on a plurality of routing paths passing through the $i^{th}$ node, a ranking relationship between numbers of a plurality of $(i-1)^{th}$ nodes on the plurality of routing paths passing through the $i^{th}$ node, and a ranking relationship between numbers of the plurality of routing paths passing through the $i^{th}$ node, a ranking of the plurality of routing paths passing through the $i^{th}$ node, and determines, based on the ranking of the plurality of routing paths, the second quantum key corresponding to the $i^{th}$ node on the target routing path. Optionally, the $i^{th}$ node determines, based on a ranking relationship between numbers of a plurality of $(i-2)^{th}$ nodes on a plurality of routing paths passing through the $i^{th}$ node and the $(i-1)^{th}$ node on the target routing path, and a ranking relationship between numbers of the plurality of routing paths passing through the $i^{th}$ node and the $(i-1)^{th}$ node on the target routing path, a ranking of the plurality of routing paths passing through the $i^{th}$ node and the $(i-1)^{th}$ node on the target routing path, and determines, based on the ranking of the plurality of routing paths, the first quantum key corresponding to the $i^{th}$ node on the target routing path.

In the implementation a2, the implementation a3, the implementation b2, and the implementation b3, each node may voluntarily calculate a first correspondence and/or a second correspondence. The foregoing implementations may be based on a distributed information method. To be specific, service requests in the entire network may not be collected together. However, a routing path of each service request is obtained by using a typical routing method, and then each routing path is correspondingly stored in each node through which the target routing path passes. Each node may voluntarily calculate the first correspondence and/or the second correspondence based on topology information that is stored in the node and that is of all routing paths passing through the node.

Any one of the implementation a1, the implementation a2, and the implementation a3 may be used in combination with any one of the implementation b1, the implementation b2, and the implementation b3. For example, the first quantum key corresponding to the $i^{th}$ node on the routing path in the first correspondence may be delivered by the centralized controller in the implementation a1, and the second quantum key corresponding to the $i^{th}$ node on the routing path in the second correspondence may be voluntarily calculated by the $i^{th}$ node in the implementation b3.

For another example, the first quantum key corresponding to the $i^{th}$ node on the routing path in the first correspondence may be sent by the $(i-1)^{th}$ node in the implementation a2, and the second quantum key corresponding to the $i^{th}$ node on the routing path in the second correspondence may be calculated by the $i^{th}$ node in the implementation b3.

For another example, the first quantum key corresponding to the $i^{th}$ node on the routing path in the first correspondence may be voluntarily calculated by the $i^{th}$ node in the implementation a3, and the second quantum key corresponding to the $i^{th}$ node on the routing path in the second correspondence may be sent by the $(i+1)^{th}$ node in the implementation b2.

For another example, the first quantum key corresponding to the $i^{th}$ node on the routing path in the first correspondence may be voluntarily calculated by the $i^{th}$ node in the implementation a3, and the second quantum key corresponding to the $i^{th}$ node on the routing path in the second correspondence may be voluntarily calculated by the $i^{th}$ node in the implementation b3. In this example, the $i^{th}$ node may determine, in any one of the implementation a3-1 to the implementation a3-3, the first quantum key corresponding to the $i^{th}$ node on the routing path, or may determine, in either of the implementation b3-1 and the implementation b3-2, the second quantum key corresponding to the $i^{th}$ node on the routing path. A selection manner is flexible. For example, the implementation a3-1 may be used in combination with the implementation b3-1, or the implementation a3-2 may be used in combination with the implementation b3-2, or the implementation a3-3 may be used in combination with the implementation b3-2.

Optionally, in this embodiment of this application, the table shown in FIG. 6 may be cyclically used. For example, in FIG. 6, routing paths passing through the node B and the node D are the routing path $L_1$, the routing path $L_2$, the routing path $L_3$, and the routing path $L_5$, which are sequentially ranked $L_1$, $L_2$, $L_3$, and $L_5$. The first quantum key pushed by a QKD system connected to the node B and the node D may be distributed to the routing path $L_1$, where an identifier of the first quantum key may be represented by $K_{DB}(L)$ in FIG. 6, the second key is distributed to the routing path $L_2$, the third key is distributed to the routing path $L_3$, the fourth key is distributed to the routing path $L_5$, the fifth key is distributed to the routing path $L_1$ again, and so on. That one quantum key is distributed to each of the routing path $L_1$ to the routing path $L_5$ may be referred to as one quantum key distribution period. In one period, one quantum key may be distributed to each routing path, or different quantities of quantum keys may be distributed to different routing paths based on a weight or a preset rule. For example, three quantum keys may be distributed to one routing path in one quantum key distribution period.

In the embodiments of this application, the quantum communication system may be divided into a plurality of local area networks. FIG. 12 is an example of a schematic structural diagram of a local area network obtained by dividing a quantum communication system according to an embodiment of this application. As shown in FIG. 12, a quantum communication network may be divided into a plurality of local area networks, for example, a local area network 1201 and a local area network 1202 shown in FIG. 12. A gateway node may be disposed in each local area network, and one or more gateway nodes may be disposed in each local area network. FIG. 12 only shows an example of disposing one gateway node in one local area network. As shown in FIG. 12, when a node (for example, a node $M_1$) in the local area network 1201 needs to communicate with a node (for example, a node $M_6$) in the local area network 1202, the node $M_1$ may first send data to a gateway node $S_1$ in the local area network 1201, and then the gateway node $S_1$ in the local area network 1201 correspondingly sends the data to a gateway node $S_2$ in the local area network 1202, so that the gateway node $S_2$ forwards the data to the node $M_6$ in the local area network 1202. In other words, when nodes in different local area networks communicate with each other, a source node may send data to a gateway node in a local area network including the source node, and then the gateway node in the local area network including the source node transmits the data to a gateway node in a local area network including a destination node, so that the gateway node in the local area network including the destination node transmits the data to the destination node. In this case, a routing path corresponding to a service request in each local area network may be calculated with assistance of a gateway node in the local area network, so that pressure of a centralized controller can be alleviated.

Based on the foregoing content, an embodiment of this application provides a quantum communication method. A specific operation procedure is as follows:

From a moment 0 to a moment T1, one or more nodes initiate encryption service requests. The encryption service request may include an encryption service request corresponding to a newly added service, or may include an encryption service request corresponding to a cancelled existing service.

Optionally, in an implementation, an encryption service request initiated by a node may be sent to the centralized controller, or may be sent to a gateway node in a local area network including the node. Alternatively, a centralized control end is disposed, and an encryption service request initiated by a node may be sent to the centralized control end.

When the node sends an encryption service request to the centralized controller, the centralized controller may plan a routing path corresponding to the encryption service request. The centralized controller may globally optimize the routing path during routing path planning. In this embodiment of this application, the centralized controller may be replaced with the centralized control end, or another device having a function of the centralized controller in this embodiment of this application.

When the node sends an encryption service request to the gateway node in the local area network including the node, the gateway node may plan a routing path in the local area network including the gateway node. When the encryption service request needs to cross at least two local area networks, the centralized controller may plan routing paths between gateway nodes in different local area networks, so that pressure of the centralized controller can be alleviated.

The routing path may be delivered to all nodes on the routing path.

Optionally, a key update rate required for each encryption service may be further recorded. For a pair of nodes with a relatively high key update rate, a plurality of parallel routing paths may be used to increase a final total key obtaining rate, or increase a weight on a specific routing path. When a routing path is calculated, the routing path may be optimized and adjusted based on a maximum key generation rate of each actual QKD link, so as to avoid a case in which key generation rates of many routing paths are limited because these routing paths pass through a same link.

From the moment T1 to a moment T2, each node determines, based on information about a newly delivered routing path, a first correspondence and a second correspondence that corresponds to each node. A specific manner may be shown in the implementation a1 to the implementation b2. Details are not described herein again.

If each node still stores a historical first correspondence and a historical second correspondence, the historical first correspondence and the historical second correspondence may be replaced with the newly obtained first correspondence and second correspondence.

Optionally, in this time period, a destination node may properly process various types of information received in this time period.

From the moment T2 to a moment T3, for each node, the node calculates, based on the updated first correspondence and the updated second correspondence, a third quantum key corresponding to the node on each routing path passing through the node, and after obtaining a calculation result, deletes, within preset duration, a first quantum key and a second quantum key that correspond to the node on each routing path passing through the node. The preset duration may be set to a relatively small value, for example, may be 1 minute or 30 seconds. Therefore, quantum key distribution can be improved.

Optionally, the node may publicize the third quantum key corresponding to the node on each routing path passing through the node, and related information of each routing path passing through the node. The node may publicize information in a plurality of manners. For example, the node may report the information only to a centralized control node, or may publicize information for internal use, in other words, among a specific group in a quantum network, or may publicize the information to a third party, for example, to a third-party supervision organization, or even may publicize the information to an entire network because the information does not affect security. However, it is generally considered that different information may be publicized in different domains. Because the publicized information can help analyze a network status if being properly used, authentication needs to be performed when the information is publicized, to ensure that the information is sent by the current node. In addition, the publicized information may be further uploaded to a blockchain, to further prevent the publicized information from being tampered with.

Optionally, for a source node on a routing path, after receiving information publicized by each of nodes on the routing path, the source node may send a second ciphertext corresponding to the source node, where the node may publicize a third quantum key corresponding to the node on each routing path passing through the node, and related information of each routing path passing through the node.

Optionally, for a destination node on a routing path, after receiving information publicized by each of nodes on the routing path, the destination node may obtain a to-be-shared quantum key between a source node and the destination node from a second ciphertext corresponding to the source node through decryption, where the node may publicize a third quantum key corresponding to the node on each routing path passing through the node, and related information of each routing path passing through the node. Optionally, the to-be-shared quantum key may be stored in a service key pool, and the service key pool is confidential storage space.

Figure 13:
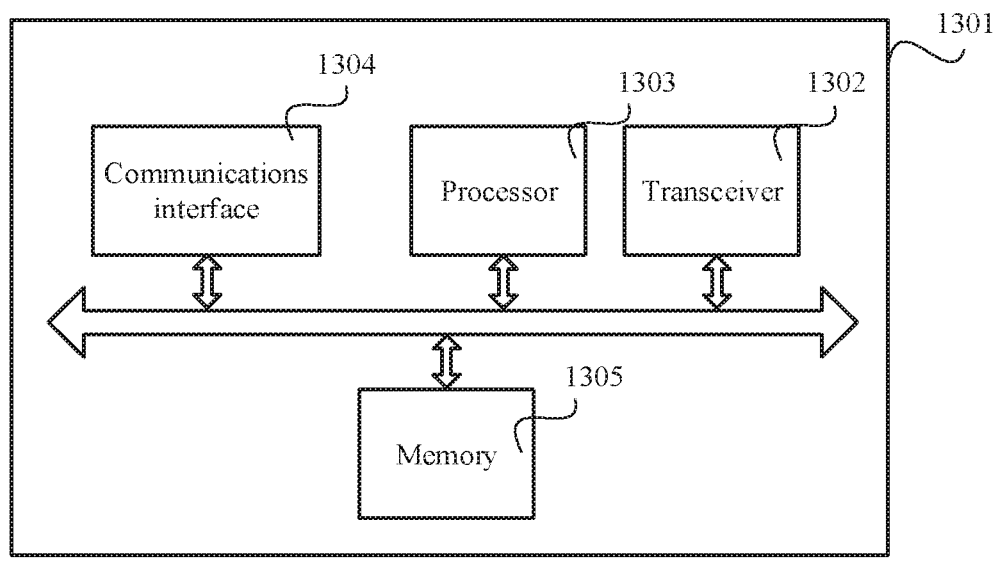
FIG. 13 is a schematic structural diagram of a quantum key distribution device according to an embodiment of this application.

Based on a same concept, this application provides a quantum key distribution device 1301, configured to perform any solution on a receive side in the foregoing method. FIG. 13 is an example of a schematic structural diagram of a quantum key distribution device according to this application. As shown in FIG. 13, the quantum key distribution device 1301 includes a processor 1303, a transceiver 1302, a memory 1305, and a communications interface 1304. The processor 1303, the transceiver 1302, the memory 1305, and the communications interface 1304 are connected to each other by using a bus. The quantum key distribution device 1301 in this example may be an $i^{th}$ node on a routing path in the foregoing content. A person skilled in the art may learn that the quantum key distribution device 1301 may alternatively be a source node, a destination node, or a relay node on another routing path. This embodiment of this application is limited to a solution performed when the quantum key distribution device 1301 is used as a relay node.

The memory 1305 may include a volatile memory such as a random access memory (RAM), or the memory 1305 may include a nonvolatile memory such as a flash memory, a hard disk drive (HDD), or a solid-state drive (SSD), or the memory 1305 may include a combination of the foregoing types of memories.

The communications interface 1304 may be a wired communications interface, a wireless communications interface, or a combination thereof. The wired communications interface may be, for example, an Ethernet interface, and the Ethernet interface may be an optical interface, an electrical interface, or a combination thereof. The wireless communications interface may be a WLAN interface.

The processor 1303 may be a central processing unit (CPU), a network processor (NP), or a combination of the CPU and the NP. The processor 1303 may further include a hardware chip. The foregoing hardware chip may be an application-specific integrated circuit (ASIC), a programmable logic device (PLD), or a combination thereof. The PLD may be a complex programmable logic device (CPLD), a field programmable logic gate array (FPGA), generic array logic (GAL), or any combination thereof.

Optionally, the memory 1305 may be further configured to store a program instruction. The processor 1303 can perform one or more steps or an optional implementation in the embodiment in the foregoing solution by invoking the program instruction stored in the memory 1305, so that the quantum key distribution device 1301 implements functions of the $i^{th}$ node in the foregoing method. The quantum key distribution device 1301 is an $i^{th}$ node on a routing path of a quantum communication system. The processor 1303 in the quantum key distribution device 1301 is configured to: determine, based on a first correspondence, a first quantum key corresponding to the $i^{th}$ node on a target routing path: determine, based on a second correspondence, a second quantum key corresponding to the $i^{th}$ node on the target routing path; and generate, based on the first quantum key corresponding to the $i^{th}$ node on the target routing path and the second quantum key corresponding to the $i^{th}$ node on the target routing path, a third quantum key corresponding to the $i^{th}$ node on the target routing path, where the $i^{th}$ node is the $i^{th}$ node on the target routing path, the first quantum key corresponding to the $i^{th}$ node on the target routing path is a quantum key that is obtained by the $i^{th}$ node and that is shared or to be shared between the $i^{th}$ node and an $(i-1)^{th}$ node on the target routing path, the first correspondence includes a correspondence between each of N routing paths passing through the $i^{th}$ node and each of N first quantum keys corresponding to the $i^{th}$ node, the N routing paths are in a one-to-one correspondence with the N first quantum keys corresponding to the $i^{th}$ node, the target routing path is one of the N routing paths, N is a positive integer, and i is a positive integer: and the second quantum key corresponding to the $i^{th}$ node on the target routing path is a quantum key that is obtained by the $i^{th}$ node and that is shared or to be shared between the $i^{th}$ node and an $(i+1)^{th}$ node on the target routing path, the second correspondence includes a correspondence between each of the N routing paths passing through the $i^{th}$ node and each of N second quantum keys corresponding to the $i^{th}$ node, and the N routing paths are in a one-to-one correspondence with the N second quantum keys corresponding to the $i^{th}$ node. The transceiver 1302 is configured to: send the third quantum key corresponding to the $i^{th}$ node on the target routing path to a destination node on the target routing path; or encrypt, by using the processor 1303 by using the third quantum key corresponding to the $i^{th}$ node on the target routing path, a first ciphertext received from the $(i-1)^{th}$ node on the target routing path, and send an obtained second ciphertext corresponding to the $i^{th}$ node to the $(i+1)^{th}$ node on the target routing path.

The first ciphertext received by the $i^{th}$ node from the $(i-1)^{th}$ node on the target routing path is a second ciphertext that is sent by the $(i-1)^{th}$ node and that corresponds to the $(i-1)^{th}$ node, and when i is 1, a $0^{th}$ node is a source node on the target routing path, and a second ciphertext corresponding to the source node on the target routing path is obtained by encrypting a to-be-shared quantum key between the source node on the target routing path and the destination node on the target routing path by using a second quantum key corresponding to the source node on the target routing path.

A second quantum key corresponding to the $(i-1)^{th}$ node on the target routing path is the same as the first quantum key corresponding to the $i^{th}$ node on the target routing path, and the second quantum key corresponding to the $i^{th}$ node on the target routing path is the same as a first quantum key corresponding to the $(i+1)^{th}$ node on the target routing path.

In a possible implementation, if N is an integer greater than 1, for a first routing path and a second routing path in the N routing paths passing through the $i^{th}$ node, a first quantum key corresponding to the $i^{th}$ node on the first routing path is different from a first quantum key corresponding to the $i^{th}$ node on the second routing path; and a second quantum key corresponding to the $i^{th}$ node on the first routing path is different from a second quantum key corresponding to the $i^{th}$ node on the second routing path.

In a possible implementation, the transceiver 1302 is further configured to receive indication information that is sent by a centralized controller or the $(i-1)^{th}$ node on the target routing path and that is used to indicate the first quantum key corresponding to the $i^{th}$ node on the target routing path in the first correspondence; or the processor 1303 is further configured to determine, based on obtained network topology information of a quantum communication system and a first preset rule, the first quantum key corresponding to the $i^{th}$ node on the target routing path in the first correspondence.

The first quantum key corresponding to the $i^{th}$ node on the target routing path is determined in a plurality of manners. For details, refer to the descriptions of the implementation a3-1, the implementation a3-2, and the implementation a3-3 in the foregoing content. Details are not described herein again.

In a possible implementation, the transceiver 1302 is configured to receive indication information that is sent by the centralized controller or the $(i+1)^{th}$ node corresponding to the target routing path and that is used to indicate the second quantum key corresponding to the $i^{th}$ node on the target routing path in the second correspondence; or the processor 1303 is configured to determine, based on the obtained network topology information of the quantum communication system and a second preset rule, the second quantum key corresponding to the $i^{th}$ node on the target routing path in the second correspondence.

The second quantum key corresponding to the $i^{th}$ node on the target routing path is determined in a plurality of manners. For details, refer to the descriptions of the implementation b3-1 and the implementation b3-2 in the foregoing content. Details are not described herein again.

Figure 14:
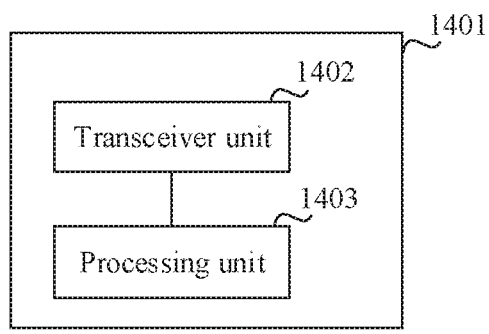
FIG. 14 is a schematic structural diagram of another quantum key distribution device according to an embodiment of this application.

Based on a same concept, an embodiment of this application provides a quantum key distribution device, configured to perform any solution on an $i^{th}$ node side in the foregoing method procedure. FIG. 14 is an example of a schematic structural diagram of a quantum key distribution device according to an embodiment of this application. As shown in FIG. 14, a quantum key distribution device 1401 includes a transceiver unit 1402 and a processing unit 1403. The quantum key distribution device 1401 in this example may be an $i^{th}$ node on a routing path in the foregoing content. A person skilled in the art may learn that the quantum key distribution device 1401 may alternatively be a source node, a destination node, or a relay node on another routing path. This embodiment of this application is limited to a solution performed when the quantum key distribution device 1401 is used as a node.

The processing unit 1403 is configured to: determine, based on a first correspondence, a first quantum key corresponding to the $i^{th}$ node on a target routing path; determine, based on a second correspondence, a second quantum key corresponding to the $i^{th}$ node on the target routing path; and generate, based on the first quantum key corresponding to the $i^{th}$ node on the target routing path and the second quantum key corresponding to the $i^{th}$ node on the target routing path, a third quantum key corresponding to the $i^{th}$ node on the target routing path, where the $i^{th}$ node is the $i^{th}$ node on the target routing path, the first quantum key corresponding to the $i^{th}$ node on the target routing path is a quantum key that is obtained by the $i^{th}$ node and that is shared or to be shared between the $i^{th}$ node and an $(i-1)^{th}$ node on the target routing path, the first correspondence includes a correspondence between each of N routing paths passing through the $i^{th}$ node and each of N first quantum keys corresponding to the $i^{th}$ node, the N routing paths are in a one-to-one correspondence with the N first quantum keys corresponding to the $i^{th}$ node, the target routing path is one of the N routing paths, N is a positive integer, and i is a positive integer; and the second quantum key corresponding to the $i^{th}$ node on the target routing path is a quantum key that is obtained by the $i^{th}$ node and that is shared or to be shared between the $i^{th}$ node and an $(i+1)^{th}$ node on the target routing path, the second correspondence includes a correspondence between each of the N routing paths passing through the $i^{th}$ node and each of N second quantum keys corresponding to the $i^{th}$ node, and the N routing paths are in a one-to-one correspondence with the N second quantum keys corresponding to the $i^{th}$ node. The transceiver 1402 is configured to: send the third quantum key corresponding to the $i^{th}$ node on the target routing path to a destination node on the target routing path: or encrypt, by using the processor by using the third quantum key corresponding to the $i^{th}$ node on the target routing path, a first ciphertext received from the $(i-1)^{th}$ node on the target routing path, and send an obtained second ciphertext corresponding to the $i^{th}$ node to the $(i+1)^{th}$ node on the target routing path.

The first ciphertext received by the $i^{th}$ node from the $(i-1)^{th}$ node on the target routing path is a second ciphertext that is sent by the $(i-1)^{th}$ node and that corresponds to the $(i-1)^{th}$ node, and when i is 1, a $0^{th}$ node is a source node on the target routing path, and a second ciphertext corresponding to the source node on the target routing path is obtained by encrypting a to-be-shared quantum key between the source node on the target routing path and the destination node on the target routing path by using a second quantum key corresponding to the source node on the target routing path. A second quantum key corresponding to the $(i-1)^{th}$ node on the target routing path is the same as the first quantum key corresponding to the $i^{th}$ node on the target routing path, and the second quantum key corresponding to the $i^{th}$ node on the target routing path is the same as a first quantum key corresponding to the $(i+1)^{th}$ node on the target routing path.

It should be understood that division of the units of the foregoing quantum key distribution device is merely logical function division. During actual implementation, all or some of the units may be integrated into one physical entity, or may be physically separated. In this embodiment of this application, the transceiver unit 1402 may be implemented by the transceiver 1302 in FIG. 13, and the processing unit 1403 may be implemented by the processor 1303 in FIG. 13. To be specific, the transceiver unit 1402 in this embodiment of this application may perform the solution performed by the transceiver 1302 in FIG. 13, and the processing unit 1403 in this embodiment of this application may perform the solution performed by the processor 1303 in FIG. 13. For other content, refer to the foregoing content. Details are not described herein again. As shown in FIG. 13, the memory 1305 included in the quantum key distribution device 1301 may be configured to store code used by the processor 1303 included in the quantum key distribution device 1301 to perform the solution. The code may be a program/code pre-installed when the quantum key distribution device 1301 is delivered from a factory.

All or some of the foregoing embodiments may be implemented by using software, hardware, firmware, or any combination thereof. When the software is used to implement the embodiments, all or some of the foregoing embodiments may be implemented in a form of a computer program product. The computer program product includes one or more instructions. When the computer program instructions are loaded and executed on a computer, the procedures or functions according to the embodiments of this application are all or partially generated. The computer may be a general-purpose computer, a special-purpose computer, a computer network, or another programmable apparatus. The instructions may be stored in a computer storage medium, or may be transmitted from a computer storage medium to another computer storage medium. For example, the instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by the computer, or a data storage device, such as a server or a data center, integrating one or more usable media. The usable medium may be a magnetic medium (for example, a floppy disk, a hard disk, a magnetic tape, or a magneto-optical disc (MO)), an optical medium (for example, a CD, a DVD, a BD, or an HVD), a semiconductor medium (for example, a ROM, an EPROM, an EEPROM, a nonvolatile memory (NVM), or a solid state disk (SSD), or the like.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. In addition, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that instructions may be used to implement each process and/or each block in the flowcharts and/or the block diagrams and a combination of a process and/or a block in the flowcharts and/or the block diagrams. These instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to the embodiments of this application without departing from the spirit and scope of this application. This application is intended to cover these modifications and variations provided that they fall within the scope of protection defined by the following claims and their equivalent technologies.

What is claimed is:

1. A method for quantum key distribution, comprising:
    determining, by an $i^{th}$ node on a target routing path and based on a first mapping, a first quantum key of N first quantum keys corresponding to the $i^{th}$ node, wherein the first quantum key is obtained by the $i^{th}$ node for sharing between the $i^{th}$ node and an $(i-1)^{th}$ node on the target routing path, the first mapping comprises N one-to-one correspondences between N routing paths passing through the $i^{th}$ node and the N first quantum keys, the target routing path is comprised in the N routing paths;

determining, by the $i^{th}$ node based on a second mapping, a second quantum key of N second quantum keys corresponding to the $i^{th}$ node, wherein the second quantum key corresponding to the $i^{th}$ node on the target routing path is obtained by the $i^{th}$ node for sharing between the $i^{th}$ node and an $(i+1)^{th}$ node on the target routing path, the second mapping comprises N one-to-one correspondences between the N routing paths passing through the $i^{th}$ node and the N second quantum keys;

generating, by the $i^{th}$ node based on the first quantum key corresponding to the $i^{th}$ node and the second quantum key corresponding to the $i^{th}$ node, a third quantum key corresponding to the $i^{th}$ node on the target routing path;

encrypting, by the $i^{th}$ node by using the third quantum key, a first ciphertext received from the $(i-1)^{th}$ node to obtain a second ciphertext; and sending, by the $i^{th}$ node, the second ciphertext corresponding to the $i^{th}$ node to the $(i+1)^{th}$ node, wherein the first ciphertext is the second ciphertext sent by and corresponding to the $(i-1)^{th}$ node, and when i=1, a 0th node is a source node on the target routing path, and the second ciphertext corresponding to the $0^{th}$ node is obtained by encrypting a quantum key to be shared between the source node and a destination node on the target routing path by using a second quantum key of the N second quantum keys corresponding to the source node, wherein a second quantum key of the N second quantum keys corresponding to the $(i-1)^{th}$ node is same as the first quantum key corresponding to the $i^{th}$ node, and the second quantum key corresponding to the $i^{th}$ node is same as a first quantum key corresponding to the $(i+1)^{th}$ node.

2. The method according to claim 1, further comprises sending, by the $i^{th}$ node, the third quantum key to a destination node on the target routing path.

3. The method according to claim 1, wherein the first quantum key is further determined based on a ranking of the N routing paths, and wherein the ranking of the N routing paths is determined by the $i^{th}$ node based on one or more of (1) a ranking relationship between N index numbers of the $(i-1)^{th}$ node on the N routing paths passing through the $i^{th}$ node, (2) a ranking relationship between the N index numbers of the $(i+1)^{th}$ node on the N routing paths passing through the $i^{th}$ node, and (3) a ranking relationship between N index numbers of the N routing paths passing through the $i^{th}$ node.

4. The method according to claim 1, wherein the first ciphertext is encrypted by using the third quantum key based on a first algorithm that satisfies:

$g(f_E(K_{i-1,i-2}(L_j),K_{i-1,i}(L_j)),f_E(K_{i,j-1}(L_j),K_{i,j+1}(L_j)))=f_E(K_{i-1,i-2}(L_j),K_{i,j+1}(L_j))$, wherein $L_j$ is an identifier of the target routing path;

$K_{i-1,i-2}(L_j)$ is a first quantum key corresponding to the $(i-1)^{th}$ node on the target routing path $L_j$;

$K_{i-1,i}(L_j)$ is the second quantum key corresponding to the $(i-1)^{th}$ node on the target routing path $L_j$;

$K_{i,j-1}(L_j)$ is the first quantum key corresponding to the $i^{th}$ node on the target routing path $L_j$;

$K_{i,j+1}(L_j)$ is the second quantum key corresponding to the $i^{th}$ node on the target routing path $L_j$;

$f_E(\bullet)$ is a function corresponding to the second algorithm used when the third quantum key is generated; and $g(\bullet)$ is a function corresponding to the first algorithm.

5. The method according to claim 1, wherein if N is greater than 1, for a first routing path and a second routing path in the N routing paths passing through the $i^{th}$ node, a first quantum key corresponding to the $i^{th}$ node on the first routing path is different from a first quantum key corresponding to the $i^{th}$ node on the second routing path; and a second quantum key corresponding to the $i^{th}$ node on the first routing path is different from a second quantum key corresponding to the $i^{th}$ node on the second routing path.

6. The method according to claim 1, wherein the first quantum key corresponding to the $i^{th}$ node is determined based on: (1) indication information received by the $i^{th}$ node from a centralized controller or the $(i-1)^{th}$ node, or (2) network topology information of a quantum communication system and a first preset rule.

7. The method according to claim 1, wherein the second quantum key corresponding to the $i^{th}$ node is determined based on: (1) indication information received by the $i^{th}$ node from a centralized controller or the $(i+1)^{th}$ node, or (2) network topology information of a quantum communication system and a second preset rule.

8. The method according to claim 1, wherein the first quantum key is further determined based on a ranking of W routing paths, and wherein the ranking of the W routing paths is determined by the $i^{th}$ node based on one or more of (1) a ranking relationship between W index numbers of W routing paths passing through the $i^{th}$ node and the $(i+1)^{th}$ node, (2) a ranking of the W routing paths passing through the $i^{th}$ node and the $(i+1)^{th}$ node, and (3) a ranking relationship between W index numbers of an $(i+2)^{th}$ node on W routing paths passing through the $i^{th}$ node and the $(i+1)^{th}$ node.

9. A device for quantum key distribution, comprising:

at least one processor; and a non-transitory computer-readable storage medium coupled to the at least one processor and storing programming instructions for execution by the at least one processor, the programming instructions instruct the device to perform operations comprising:

determining, and based on a first mapping, a first quantum key of N first quantum keys corresponding to an $i^{th}$ node on a target routing path, wherein the first quantum key is obtained by the $i^{th}$ node for sharing between the $i^{th}$ node and an $(i-1)^{th}$ node on the target routing path, the first mapping comprises N one-to-one correspondences between N routing paths passing through the $i^{th}$ node and the N first quantum keys, the target routing path is comprised in the N routing paths;

determining, based on a second mapping, a second quantum key of N second quantum keys corresponding to the $i^{th}$ node, wherein the second quantum key corresponding to the $i^{th}$ node on the target routing path is obtained by the $i^{th}$ node for sharing between the $i^{th}$ node and an $(i+1)^{th}$ node on the target routing path, the second mapping comprises N one-to-one correspondences between the N routing paths passing through the $i^{th}$ node and the N second quantum keys;

generating, based on the first quantum key corresponding to the $i^{th}$ node and the second quantum key corresponding to the $i^{th}$ node, a third quantum key corresponding to the $i^{th}$ node on the target routing path;

encrypting, by the $i^{th}$ node by using the third quantum key, a first ciphertext received from the $(i-1)^{th}$ node to obtain a second ciphertext; and sending, by the $i^{th}$ node, the second ciphertext corresponding to the $i^{th}$ node to the $(i+1)^{th}$ node, wherein the first ciphertext is the second ciphertext sent by and corresponding to the $(i-1)^{th}$ node, and when i=1, a $0^{th}$ node is a source node on the target routing path, and the second ciphertext corresponding to the $0^{th}$ node is obtained by encrypting a quantum key to be shared between the source node and a destination node on the target routing path by using a second quantum key of the N second quantum keys corresponding to the source node, wherein a second quantum key of the N second quantum keys corresponding to the $(i-1)^{th}$ node is same as the first quantum key corresponding to the $i^{th}$ node, and the second quantum key corresponding to the $i^{th}$ node is same as a first quantum key corresponding to the $(i+1)^{th}$ node.

10. The device according to claim 9, the operations further comprising:

sending the third quantum key to a destination node on the target routing path.

11. The device according to claim 9, wherein the first quantum key is further determined based on a ranking of the N routing paths, and wherein the ranking of the N routing paths is determined by the $i^{th}$ node based on one or more of (1) a ranking relationship between N index numbers of the $(i-1)^{th}$ node on the N routing paths passing through the $i^{th}$ node, (2) a ranking relationship between the N index numbers of the $(i+1)^{th}$ node on the N routing paths passing through the $i^{th}$ node, and (3) a ranking relationship between N index numbers of the N routing paths passing through the $i^{th}$ node.

12. The device according to claim 9, wherein the first ciphertext is encrypted by using the third quantum key based on a first algorithm that satisfies:

$g(f_E(K_{i-1,i-2}(L_j), K_{i-1,i}(L_j)), f_E(K_{i,j-1}(L_j), K_{i,j+1}(L_j))) = f_E(K_{i-1,i-2}(L_j), K_{i,j+1}(L_j))$, wherein $L_j$ is an identifier of the target routing path;

$K_{i-1,i-2}(L_j)$ is a first quantum key corresponding to the $(i-1)^{th}$ node on the target routing path $L_j$;

$K_{i-1,i}(L_j)$ is the second quantum key corresponding to the $(i-1)^{th}$ node on the target routing path $L_j$;

$K_{i,j-1}(L_j)$ is the first quantum key corresponding to the $i^{th}$ node on the target routing path $L_j$;

$K_{i,j+1}(L_j)$ is the second quantum key corresponding to the $i^{th}$ node on the target routing path $L_j$;

$f_E(\cdot)$ is a function corresponding to the second algorithm used when the third quantum key is generated; and $g(\cdot)$ is a function corresponding to the first algorithm.

13. The device according to claim 9, wherein if N is greater than 1, for a first routing path and a second routing path in the N routing paths passing through the $i^{th}$ node, a first quantum key corresponding to the $i^{th}$ node on the first routing path is different from a first quantum key corresponding to the $i^{th}$ node on the second routing path; and a second quantum key corresponding to the $i^{th}$ node on the first routing path is different from a second quantum key corresponding to the $i^{th}$ node on the second routing path.

14. The device according to claim 9, wherein the first quantum key corresponding to the $i^{th}$ node is determined based on: (1) indication information received by the $i^{th}$ node from a centralized controller or the $(i-1)^{th}$ node, or (2) network topology information of a quantum communication system and a first preset rule.

15. The device according to claim 9, wherein the second quantum key corresponding to the $i^{th}$ node is determined based on: (1) indication information received by the $i^{th}$ node from a centralized controller or the $(i+1)^{th}$ node, or (2) network topology information of a quantum communication system and a second preset rule.

16. The device according to claim 9, wherein the first quantum key is further determined based on a ranking of W routing paths, and wherein the ranking of the W routing paths is determined by the $i^{th}$ node based on one or more of (1) a ranking relationship between W index numbers of W routing paths passing through the $i^{th}$ node and the $(i+1)^{th}$ node, (2) a ranking of the W routing paths passing through the $i^{th}$ node and the $(i+1)^{th}$ node, and (3) a ranking relationship between W index numbers of an $(i+2)^{th}$ node on W routing paths passing through the $i^{th}$ node and the $(i+1)^{th}$ node.

17. A non-transitory, computer-readable medium storing one or more instructions executable by at least one processor to perform operations comprising:

determining, based on a first mapping, a first quantum key of N first quantum keys corresponding to an $i^{th}$ node on a target routing path, wherein the first quantum key is obtained by the $i^{th}$ node for sharing between the $i^{th}$ node and an $(i-1)^{th}$ node on the target routing path, the first mapping comprises N one-to-one correspondences between N routing paths passing through the $i^{th}$ node and the N first quantum keys, the target routing path is comprised in the N routing paths;

determining, based on a second mapping, a second quantum key of N second quantum keys corresponding to the $i^{th}$ node, wherein the second quantum key corresponding to the $i^{th}$ node on the target routing path is obtained by the $i^{th}$ node for sharing between the $i^{th}$ node and an $(i+1)^{th}$ node on the target routing path, the second mapping comprises N one-to-one correspondences between the N routing paths passing through the $i^{th}$ node and the N second quantum keys;

generating, by the $i^{th}$ node based on the first quantum key corresponding to the $i^{th}$ node and the second quantum key corresponding to the $i^{th}$ node, a third quantum key corresponding to the $i^{th}$ node on the target routing path;

encrypting, by the $i^{th}$ node by using the third quantum key, a first ciphertext received from the $(i-1)^{th}$ node to obtain a second ciphertext; and sending, by the $i^{th}$ node, the second ciphertext corresponding to the $i^{th}$ node to the $(i+1)^{th}$ node, wherein the first ciphertext is the second ciphertext sent by and corresponding to the $(i-1)^{th}$ node, and when i=1, a $0^{th}$ node is a source node on the target routing path, and the second ciphertext corresponding to the $0^{th}$ node is obtained by encrypting a quantum key to be shared between the source node and a destination node on the target routing path by using a second quantum key of the N second quantum keys corresponding to the source node, wherein a second quantum key of the N second quantum keys corresponding to the $(i-1)^{th}$ node is same as the first quantum key corresponding to the $i^{th}$ node, and the second quantum key corresponding to the $i^{th}$ node is same as a first quantum key corresponding to the $(i+1)^{th}$ node.

18. The non-transitory, computer-readable medium according to claim 17, the operations further comprising:
sending the third quantum key to a destination node on the target routing path.

* * * * *

UNITED STATES PATENT AND TRADEMARK OFFICE
CERTIFICATE OF CORRECTION

PATENT NO. : 11,595,196 B2
APPLICATION NO. : 17/069317
DATED : February 28, 2023
INVENTOR(S) : Zhengyu Li et al.

It is certified that error appears in the above-identified patent and that said Letters Patent is hereby corrected as shown below:

In the Claims

In Column 27, In Line 28, In Claim 1, delete "0th" and insert -- $0^{th}$ --.

In Column 27, In Line 59-60, In Claim 4, delete
"$g(fE(Ki-1,i-2(Lj),Ki-1,i(Lj)),fE(Ki,j-1(Lj),Ki,j+1(Lj)))=fE(Ki-1,i-2(Lj),Ki, j+1(Lj))$," and insert
-- $g(fE(Ki-1,i-2(Lj),Ki-1,i(Lj)),fE(Ki,i-1(Lj),Ki,i+1(Lj)))=fE(Ki-1,i-2(Lj),Ki,i+1(Lj))$, --.

In Column 27, In Line 64, In Claim 4, delete "Ki–1,j(Lj)" and insert -- Ki–1,i(Lj) --.

In Column 27, In Line 66, In Claim 4, delete "Ki,j–1(Lj)" and insert -- Ki,i–1(Lj) --.

In Column 28, In Line 1, In Claim 4, delete "Ki,j+1(Lj)" and insert -- Ki,i+1(Lj) --.

In Column 29, In Line 46-47, In Claim 12, delete
"$g(fE(Ki-1,i-2(Lj),Ki-1,i(Lj)),fE(Ki,j-1(Lj),Ki,j+1(Lj)))=fE(Ki-1,i-2(Lj),Ki, j+1(Lj))$," and insert
-- $g(fE(Ki-1,i-2(Lj),Ki-1,i(Lj)),fE(Ki,i-1(Lj),Ki,i+1(Lj)))=fE(Ki-1,i-2(Lj),Ki,i+ 1(Lj))$, --.

In Column 29, In Line 51, In Claim 12, delete "Ki–1,j(Lj)" and insert -- Ki–1,i(Lj) --.

In Column 29, In Line 53, In Claim 12, delete "Ki,j–1(Lj)" and insert -- Ki,i–1(Lj) --.

In Column 29, In Line 55, In Claim 12, delete "Ki,j+1(Lj)" and insert -- Ki,i+1 (Lj) --.

Signed and Sealed this
Thirtieth Day of May, 2023

Katherine Kelly Vidal
*Director of the United States Patent and Trademark Office*